(12) United States Patent
Kake et al.

(10) Patent No.: US 7,587,681 B2
(45) Date of Patent: Sep. 8, 2009

(54) METHOD AND APPARATUS FOR PRESENTING INFORMATION

(75) Inventors: Tomokazu Kake, Tokyo (JP); Kensuke Kita, Tokyo (JP); Hiromasa Horie, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 702 days.

(21) Appl. No.: 10/858,487

(22) Filed: Jun. 1, 2004

(65) Prior Publication Data
US 2005/0010599 A1    Jan. 13, 2005

(30) Foreign Application Priority Data
Jun. 16, 2003 (JP) .............. 2003-171125

(51) Int. Cl.
*G06F 7/00* (2006.01)
*G06F 3/048* (2006.01)

(52) U.S. Cl. .................... 715/805; 707/104.1
(58) Field of Classification Search ............. 715/848, 715/782, 810
See application file for complete search history.

(56) References Cited

U.S. PATENT DOCUMENTS

| | | | |
|---|---|---|---|
| 6,005,549 A * | 12/1999 | Forest | 345/157 |
| 6,144,962 A * | 11/2000 | Weinberg et al. | 707/10 |
| 6,243,094 B1 * | 6/2001 | Sklar | 715/853 |
| 6,426,761 B1 * | 7/2002 | Kanevsky et al. | 715/788 |
| 6,654,803 B1 * | 11/2003 | Rochford et al. | 709/224 |
| 6,734,873 B1 * | 5/2004 | Herf et al. | 345/629 |
| 6,961,731 B2 * | 11/2005 | Holbrook | 707/102 |
| 7,103,850 B1 * | 9/2006 | Engstrom et al. | 715/778 |

FOREIGN PATENT DOCUMENTS

JP   2002056411   2/2002

OTHER PUBLICATIONS

Notice of Reason for Refusal dated May 26, 2009, for the corresponding Japanese Application 2003-171125.

* cited by examiner

*Primary Examiner*—Doug Hutton
*Assistant Examiner*—Soumya Dasgupta
(74) *Attorney, Agent, or Firm*—Katten Muchin Rosenman LLP

(57) ABSTRACT

Files such as musical pieces are represented in symbols such as a star, and are clustered based on the attribute of each file so as to be allocated in an information space. An impression, such as "refreshing", on the musical piece corresponding to the file is represented and given in the form of emotion. The initial search for a file is carried out by roughly cutting out a marked-out space. When narrowed down, the file is linearly developed so as to support a user selection.

4 Claims, 15 Drawing Sheets

METHOD AND APPARATUS FOR PRESENTING INFORMATION

BACKGROUND OF THE INVENTION

1. Field of the Invention

The present invention relates to the information presenting technologies, and it particularly relates to method and apparatus for presenting, by the use of a computer, the information that users desire to have and look for.

2. Description of the Related Art

With advances in personal computer and other information processing devices, the Internet and other network infrastructure and multimedia technology handling images and voices, coupled with a rapid increase in digital contents, it is now possible for general users to access an unprecedented volume of data or number of files. This trend will become more marked from now on as information technology makes further advances.

However, the increase in the number of files or the amount of data that can be accessed has broadened the user's choice almost limitlessly, bringing about what we may call the floods of information. In the past, files could be displayed classified under folders or directories. But when there are several thousands to tens of thousands of files, it is no longer possible to store them in folders so as to present the users with a full view of them. For example, conventional search techniques are subject to limitations when viewing the entire music file of J-POP via the Internet or selecting a desired program from hundreds of digital broadcast channels. In fact, it is only those with special skill in information search that can properly extract a most desirable piece of information in a short time from among a mass of information.

SUMMARY OF THE INVENTION

The present invention has been made in view of the foregoing circumstances and an object thereof is to provide an information presenting technology whereby a general user can find desired information from among a large amount of information with relative ease or by using intuition.

A preferred embodiment according to the present invention relates to a method for presenting information. This method includes: representing a plurality of information elements in symbols and mapping the information elements represented in symbols to an information space; and limiting the information elements using a marked-out space set in the information space. Hereinafter, whenever "information elements" are referred to, it is assumed that "each of them can be separately executed by a computer".

Another preferred embodiment according to the present invention relates also to a method for presenting information. This method includes: representing a plurality of information elements in symbols and mapping the information elements represented in symbols to an information space; and initiating the transition of the first information space to a second information space.

Still another preferred embodiment according to the present invention relates to an information presenting apparatus. This apparatus includes: a space controller which represents a plurality of information elements in symbols and maps the information elements represented in symbols to an information space; and an information selector which limits the information elements using a marked-out space set in the information space.

Still another preferred embodiment according to the present invention relates also to an information presenting apparatus. This apparatus includes: an element mapping unit which represents a plurality of information elements in symbols and which maps the information elements represented in symbols to a first information space; and a space motion instructing unit which initiates the transition of the first information space to a second information space.

Still another preferred embodiment according to the present invention relates also to an information presenting apparatus. This apparatus includes: a space controller which maps, as symbols, a plurality of information elements to an information space; and a drawing unit which draws a plurality of symbols mapped, in an inseparable manner, when the symbols are displayed at an overlapped position.

Still another preferred embodiment according to the present invention relates also to an information presenting apparatus. This apparatus includes: a space controller which maps, as symbols, a plurality of information elements to an information space; and an information selector which executes a search on the symbols in a manner such that part of the information space is cut out as a lump of volume which is assumed to include a symbol of interest.

Still another preferred embodiment according to the present invention relates also to an information presenting apparatus. This apparatus includes: a space controller which maps, as symbols, a plurality of information elements to an information space; and an information selector which cuts out, as a lump of volume, a space containing the information elements instead of directly specifying the information elements, in the event of selecting the information elements.

Still another preferred embodiment according to the present invention relates also to an information presenting apparatus. This apparatus includes: a space controller which maps, as symbols, a plurality of information elements to an information space; and a drawing unit which draws a plurality of symbols mapped, wherein the space controller represents the information space as a vast space, for example, as a vast dark space of a global or universal scale, and the drawing unit represents the symbols as luminous bodies scattered in the vast space.

Still another preferred embodiment according to the present invention relates also to an information presenting apparatus. This apparatus includes: a space controller which maps, as symbols, a plurality of information elements to an information space; and a drawing unit which draws a plurality of symbols mapped, wherein the drawing unit varies, as appropriate or autonomously, a viewpoint of drawing so as to redraw the symbols.

It is to be noted that any arbitrary combination of the above-described structural components and expressions changed between a method, an apparatus, a system, a computer readable recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
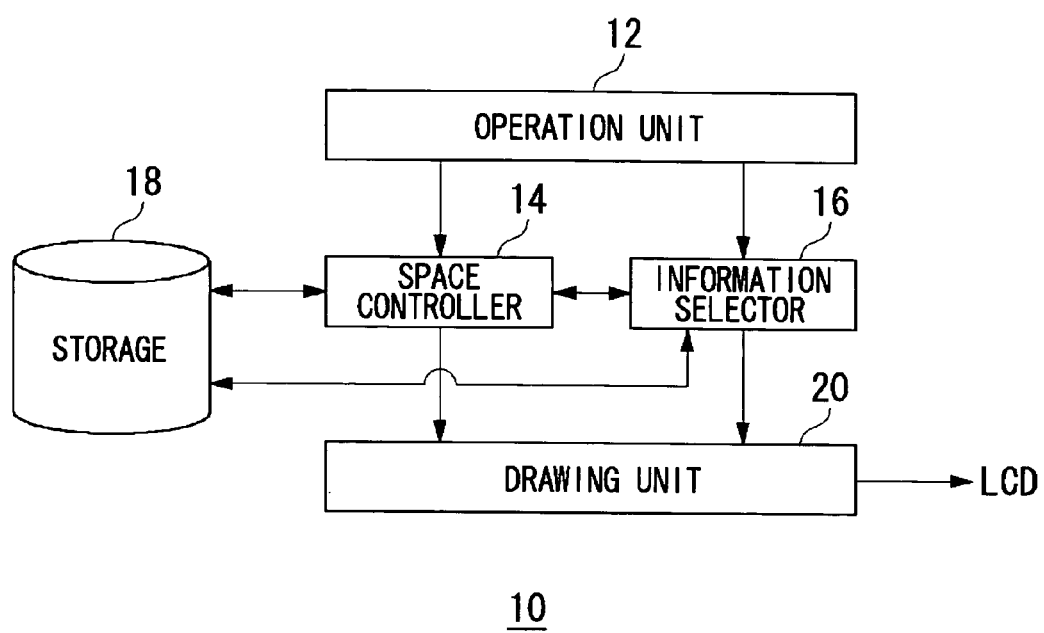
FIG. 1 illustrates a structure of an information presenting apparatus according to an embodiment of the present invention.

The invention will now be described based on embodiments which do not intend to limit the scope of the present invention but exemplify the invention. All of the features and the combinations thereof described in the embodiments are not necessarily essential to the invention.

An information presenting apparatus according to preferred embodiments of the present invention will now be outlined below.

This apparatus helps the user to have a general view of a large volume of information "loosely" first and then gradually narrow it down so as to reach a desired piece of information. More specifically, this apparatus supports the user through a series of operations of displaying, searching and selecting information when there is too much information for the user to look up. To this end, the apparatus provides a GUI (Graphical User Interface) by which the user proceeds to cut out necessary information as if he/she puts a hand in a box containing a large number of marbles and gets a handful from among them. Information is not so selected as to pinpoint it from the start but in a lump volume including related peripheral information. As this "loose search" is repeated, the information gets narrowed down to a certain degree. At this point, the search is switched to an "accurate selection" mode.

In the "accurate selection" mode, information selected is sorted one-dimensionally according to certain rules. This will also be referred to as "information development" hereinbelow. With information developed into a simple form, the user can select desired information more easily. This apparatus is therefore characterized by a limiting or narrowing-down search, wherein a volume of information space is cut out by "loose search", and an information development into one-dimensional space in an "accurate selection".

This apparatus represents a multiplicity of information elements in symbols, maps them to an information space and carries out narrowing-down of information elements using a marked-out space set in the information space. The "marked-out space" is a space of interest which is actively sought by a user. The "information elements" are each separately executable by a computer. And they are, for instance, a music file, an image file, a program file, computer programs and the like that can be executed by a click, and it is assumed hereinafter for the sake of simplicity that those represent the "information elements".

An example of "information space" is a three-dimensional space after the model of our universe. In this space, information elements are each represented by a luminous body, or a star-like symbol. Other examples of information space may include a time tunnel, a world map or a file storage space shown stereoscopically in a hierarchy of information elements. When the information space is a "time tunnel", the attributes necessary for arranging information elements may be time only in most cases. Therefore, it is not necessary that the information space is always three-dimensional; that is, the two dimensions other than the time dimension may be assigned according to some appropriate criteria for the arrangement of the information elements. Similarly, when the information space is a world map, the location thereon may be used as a two-dimensional attribute of each information element, so that the information elements may be arranged in association with the location on the world map. In this case, too, if the information elements are shown by luminous bodies and the world map is rendered in dark colors such as blue or black, then a beautiful night scene, just like the satellite photos of illuminated towns on earth at night, can be produced.

It is to be noted here that, for each information space, assignment of which attributes of the information elements to which space axes, such as X, Y and Z, is predetermined. Accordingly, an information space has a description of not only data for determining its appearance, such as space or a world map, but also data concerning the attributes, which are the axes used in arranging information elements within its own space. As a result, the information space for an axis differs from the information spaces for the other axes even when the user is seeing it from the same viewpoint.

When mapping information elements to an information space, the three attributes possessed by each of the information elements are assigned to the X, Y and Z axes, respectively, and thus the positions of the information elements within the information space are determined. The attributes are not limited to items that can be digitized objectively, such as file size, date and time of preparation or updating, or place of preparation, but may also be subjective items, such as meanings, emotions or purposes. In the case of the latter, the meaning, emotion or purpose possessed by the information elements needs to be digitized or classified beforehand. However, when such preprocessing is not done, the purpose, for instance, of the information elements may be digitized or classified through a known string pattern analysis or morphological analysis of the titles or genres thereof. In any case, it is not necessary for the rough classification of information elements, with the apparatus according to the present invention, to be carried out based on a strict methodology, but carrying it out in such a manner as somehow follows the user's intuition suffices.

Another feature of this apparatus lies in the capability of switching information spaces when appropriate. By the switching, the axis in the space changes, so that the arrangement of information elements changes considerably. During the switching of axes from one information space to another, the information space and the information elements displayed there may be changed by morphing. In such a case, the representation is possible in an intermediate information space which does not belong to any information space.

The switching of information spaces provides not only esthetic effects but also a methodology by which the user can search for a desired information element using a more reliable and precise axis. For example, when a multiplicity of movie files are represented by a "time tunnel" information space, the user can search for his/her desired movie using the attribute called "time". However, the search for a movie can normally be done more easily from genre or some more subjective classification into the impressions of movies such as "healing" or "hilarious". Hence, replacement of an information space by what we might call an "emotional space" may make the search by the user easier.

An information space can not only be switched to another but can also be shown to the user with variety added even within the same information space. For example, when a time tunnel is being displayed and there is no entry by the user for a predetermined period of time, the viewpoint for display can be moved forward in the tunnel, so that the user can get an impression of himself/herself moving forward therein. In this manner, it is possible to provide special aesthetic and visual effects by creating the display screen for information search in such a manner that the user almost has an impression of cruising therein.

Still another feature of this apparatus lies in a rather "vague" manner of displaying a large volume of information. For example, when the objects to be searched by the user are on the order of thousands, the user may be easily overwhelmed by the sheer number as long as they are to be displayed discretely in symbols. This apparatus, therefore, intentionally displays information elements vaguely in semitransparent or similar appearances and represents a concentration of a large number of them by a vague luminous body like a star cluster seen from a great distance. And using these star clusters, the rough search can be done in a manner such that the above-mentioned "loose search" is performed by cutting out by a volume a space, namely, "marked-out space", in which the user assumes his/her desired information resides. As a result of the search, if the number of information units is narrowed down to a certain extent, then the information elements may be displayed discretely in separate luminous bodies. If the narrowing-down progresses further to the degree that it is sufficient for a user's purpose, the information elements may be developed and displayed using the above-described "accurate selection".

As is obvious from the above features, this apparatus may be primarily considered a tool for guiding the user along loose search, instead of being a tool for more exact information search. Morphing or cruising as described above works in such a manner that the user is led to conducting a loose search by drawing the information space in various ways rather than conducting a concrete search. Morphing, which can represent changes in the positions of information elements dynamically, makes it easier for the user to see the differences in the information space than a static representation. Since the user can thus survey the information space from various perspectives, he/she may cut out a volume of space as a first step. This will display the information space in a different form, whose aesthetic or visual effect will further amuse the user in the use of this apparatus as a drawing tool. At this point, the user will most likely find the vague viewing of the space just as much fun as the search for information. In the process, therefore, the user does not have to put up with the stress that should otherwise result from the primary purpose of information search. Thus, this apparatus transforms the information search, which is normally a dull and tedious work, into a sensible and aesthetic activity.

As described above, the function of this apparatus for leading the user through loose search is necessitated by the presence of enormous amount of information. It is nearly impossible to directly access a single piece of information within a large volume of information. Even in the stage of narrowing down or the limiting of information, there is still a large amount of information, which makes the narrowing-down process difficult. However, this apparatus can effectively handle a large volume of information by respresenting it in the form of clouds or star clusters. This apparatus therefore not only provides a novel methodology for information search but also helps the user to fundamentally change his/her consciousness of carrying out information search.

FIG. 1 illustrates a structure of an information presenting apparatus 10 according to a preferred embodiment of the present invention. The information presenting appartaus 10 includes an operation unit 12 for inputting user instructions, a space controller 14 for controlling an information space, an information selector 16 for supporting information search, a storage 18 for storing data necessary for drawing an information space or information elements, and a drawing unit 20 for executing the drawing of an information space or information elements. Display signals outputted from the drawing unit 20 are displayed on an LCD or other display device. Part of the operation unit 12 and the drawing unit 20 function as GUI.

Figure 2A:
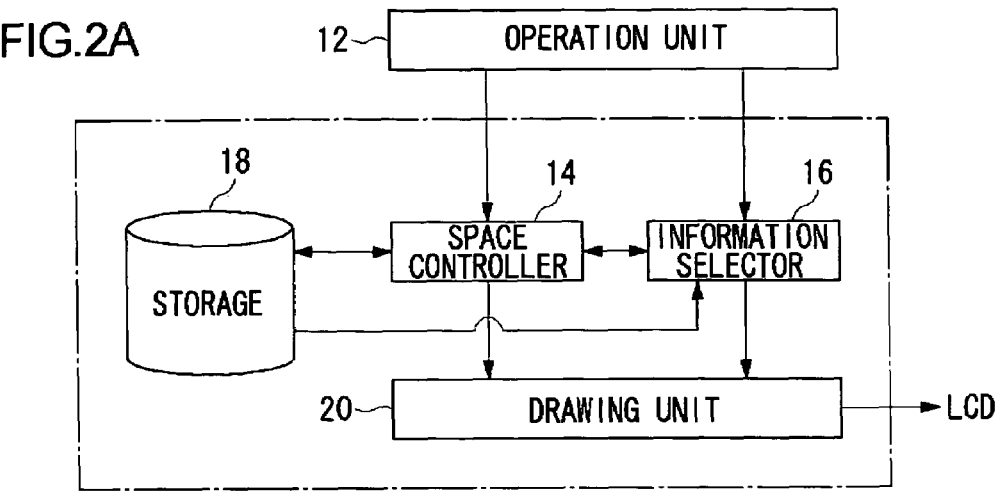
FIGS. 2A to 2C each illustrate the structure of an information presenting apparatus shown in FIG. 1 in relation to a network.
Figure 2B:
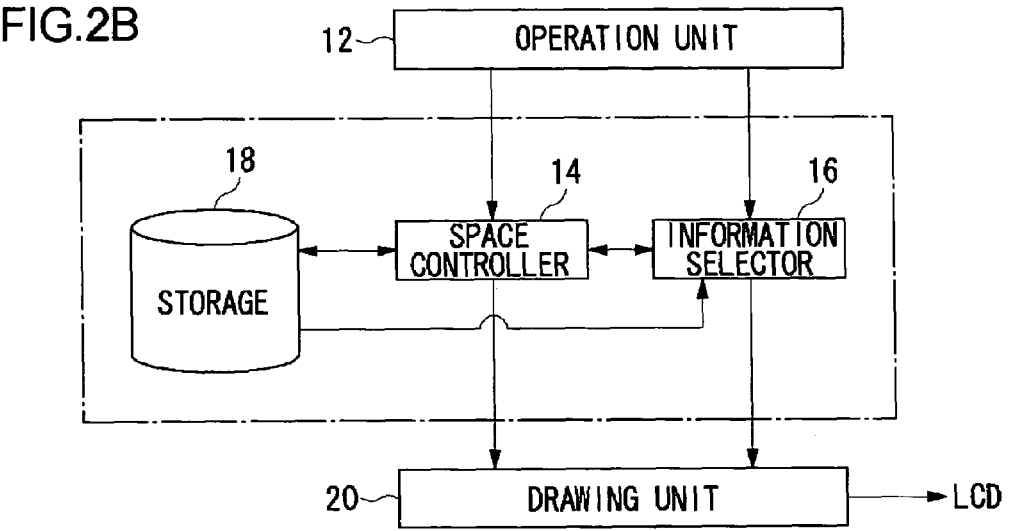
Figure 2C:
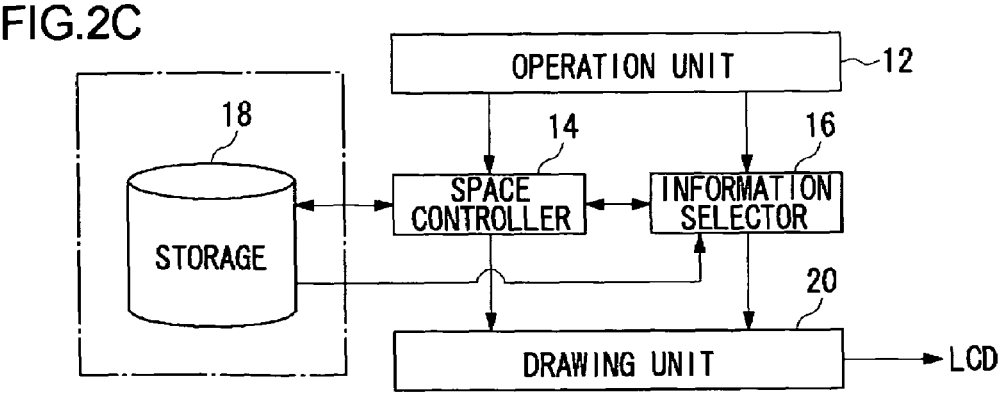

FIGS. 2A to 2C each illustrate by example an information presenting apparatus 10 in relation to a network. In FIGS. 2A to 2C, the part within a chain line exists, for instance, as an information presenting support server at a remote location via a network (hereinafter referred to as "network side"). In the case of FIG. 2A, only the operation unit 12, including such input devices as a keyboard and a mouse, and a display device are at the user, whereas the other structural components are on the network side. In such a structure, the client equipment on the user side, which is subject to reduced computation load, may be embodied easily by equipment, such as a mobile terminal, whose hardware resources are limited.

In the case of FIG. 2B, the drawing unit 20, in addition to the operation unit 12 as in FIG. 2A, is at the user, and the other structural components are on the network side. This provides an increased facility to the user because the drawing can be optimized on the user side and besides a standard library or the like can sometimes be utilized for the drawing.

In the case of FIG. 2C, only the storage 18 is on the network side while the remaining structural components are on the user side. This structure can relieve burden on the server if a certain degree of processing capacity can be expected of the equipment on the user side. Since a server can offer information spaces and information elements, a music distribution server, for instance, may be provided with the storage 18 so as to enable the user to search for and use a multiplicity of music files. It is to be a database storing only the locations of or links to the stored data without having the body of multiple file data to be searched. In such a case, a desired file is obtained by accessing the location of storage read out from the storage 18. Moreover, such an arrangement ensures a flexible system management even when there are a plurality of subjects managing a multiplicity of files.

As has been explained above, the apparatus according to the present invention may be embodied in various structures, each of which has its own advantages. The following description, however, applies regardless of the differences between such structures.

Figure 3:
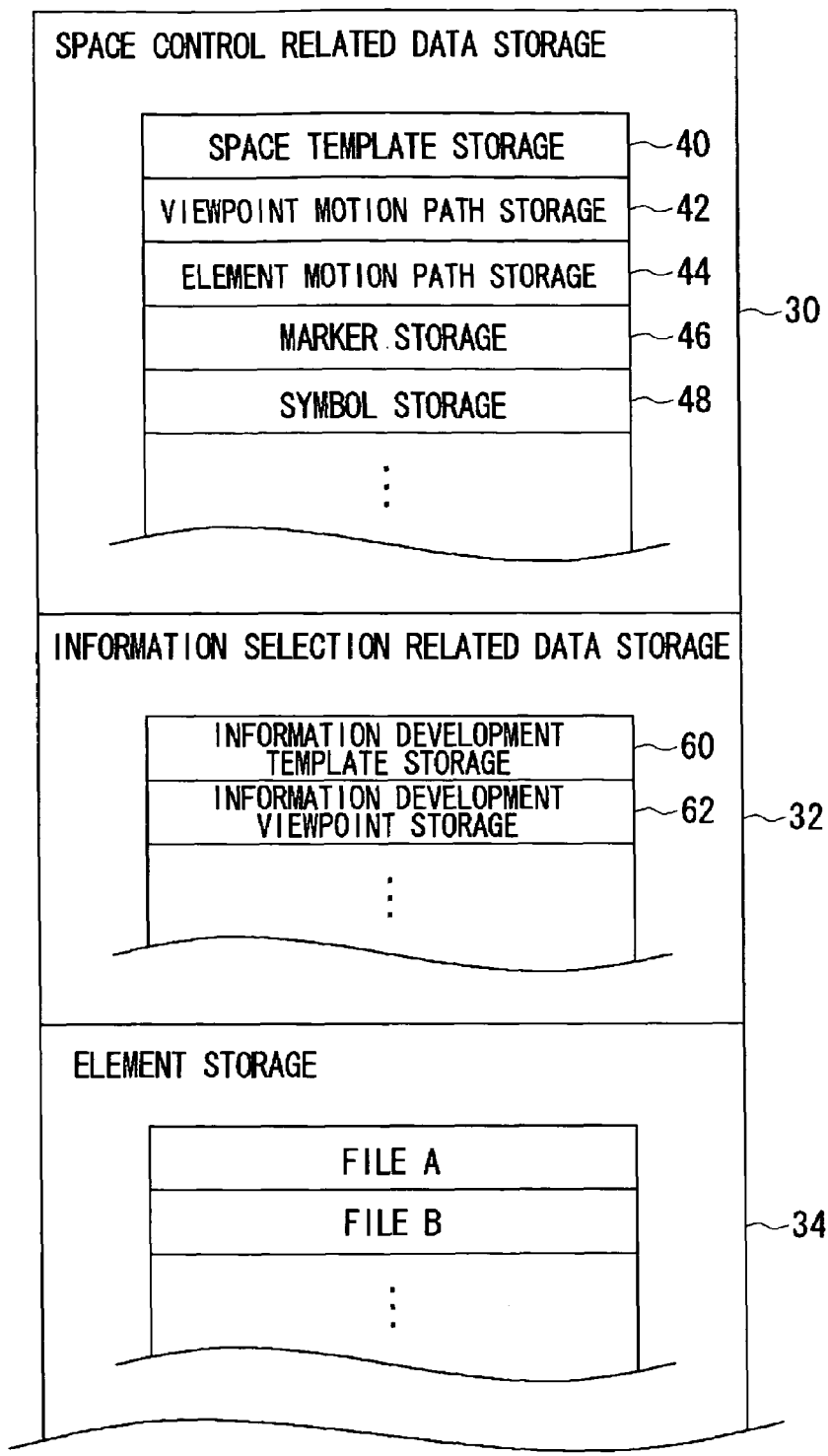
FIG. 3 shows an internal structure of a storage in an information presenting apparatus.

FIG. 3 shows an internal structures of the storage 18. The storage 18 mainly includes a space control related data storage 30 which stores data related to information spaces, an information selection related data storage 32 which stores drawing data necessary for the selection of information elements, especially for the information development in the above-described "accurate selection" mode and an element storage 34 for storing a multiplicity of files, which are information elements.

The space control related data storage 30 includes a space template 40, a viewpoint motion path storage 42, an element motion path storage 44, a marker storage 46 and a symbol storage 48. The space template storage 40 stores a plurality of information space templates. The viewpoint motion path storage 42 stores the viewpoint motion paths for the user at cruising to be described later. The element motion path storage 44 stores the motion paths for information elements at morphing to be described later. The marker storage 46 stores markers, such as "Relax" or "Cinema", shown to characterize the clusters of information elements locally present in an information space when information elements are arranged there. The symbol storage 48 stores luminous bodies, "star-shape" and so forth as symbols representing information elements.

The space template storage 40 stores identifiably an information space as the default option at the start-up of the information presenting apparatus 10 (hereinafter referred to also as "initial space"), and this initial space is drawn at the start-up by the operation of the space controller 14 and the drawing unit 20. The viewpoint motion path to the start of cruising, that is, the viewpoint when prior to the start of cruising, that is, the viewpoint motion an information space is drawn for the first time. To draw a three-dimensional space, it is necessary to set camera parameters in world coordinates, and the parameters include not only the camera viewpoint but also the optical axis or the line of sight and the angle of view. These parameters, however, will be represented by "viewpoint" in this patent specification.

The view motion path storage 42 may store the viewpoint motion path in a manner that associates it with the type of information space. For example, if the information space is a time tunnel, the storage 42 may contain a description of a viewpoint motion path where the user moves through the tunnel; if the information space is a world map, then a description of a viewpoint motion path where the earth's surface is seen from an aircraft in flight may be used with excellent visual, or aesthetic, effect. Actual description of a viewpoint motion path is done by a free curve or other known technique. Likewise, the element motion paths to be stored in the element motion path storage 44 are described by some known technique.

The information selection related data storage 32 includes an information development template storage 60 and an information development viewpoint storage 62. The information development template storage 60 stores space templates which develop information elements to be displayed for the user at the stage of information development when the user finally selects a single information element from among the considerably narrowed-down information elements. The information development viewpoint storage 62 stores viewpoint for drawing the templates.

The element storage 34 stores a multiplicity of files, such a "File A" and "File B", which correspond to their respective information elements. Though not shown, the files may be classified beforehand by genre or media type into "music", "movies", "programs" and so forth. In such a case, as will be described later, the file to be displayed first may be selected by a file selector 100 from the genre of "music", "movies" or the like.

Attributes recorded in each file are the file size, date and time of creation, creator name, place of creation, title, place of storage, file format, date of access, and the like. Of these attributes, file size and dates and times, which are numerical values from the beginning, can be arranged easily on the axes in an information space. Other attributes, however, cannot be arranged thereon unless they are digitized according to certain methods. Digitization of creator names, places of creation or titles, for instance, may be accomplished by arranging them alphabetically or in the order of kana syllabary and giving numbers to them. In digitizing the places of storage, the hierarchy of folders may be represented by a tree structure and the nodes may be encoded. File formats, which may be limited in number, may be digitized by preparing a correspondence table of formats and numbers. In doing so, the formats of image files or those of audio files may be so arranged as to have numerical values close to one another. Then the pieces of music or the items of image will be displayed close together in the information space, thus facilitating the user's search significantly. This aspect of the present embodiment will have wide use because the digitization of these attributes as mentioned above can be automated for new files as well.

Still another feature of the present embodiments lies in the digitization of "subjective" elements, which files normally do not have. Examples of subjective elements are such attributes as "emotion", "meaning" and "tendency of wording". Numerical values for these attributes may be given by the operator who carries out the embodiments. For example, the user may set the attributes by himself/herself when he/she selects the file. To enable it, for instance, an element attribute assigning unit, which is not shown, may be provided within the space controller 14, and operation from the user may be accepted via the operation unit 12.

Figure 7:
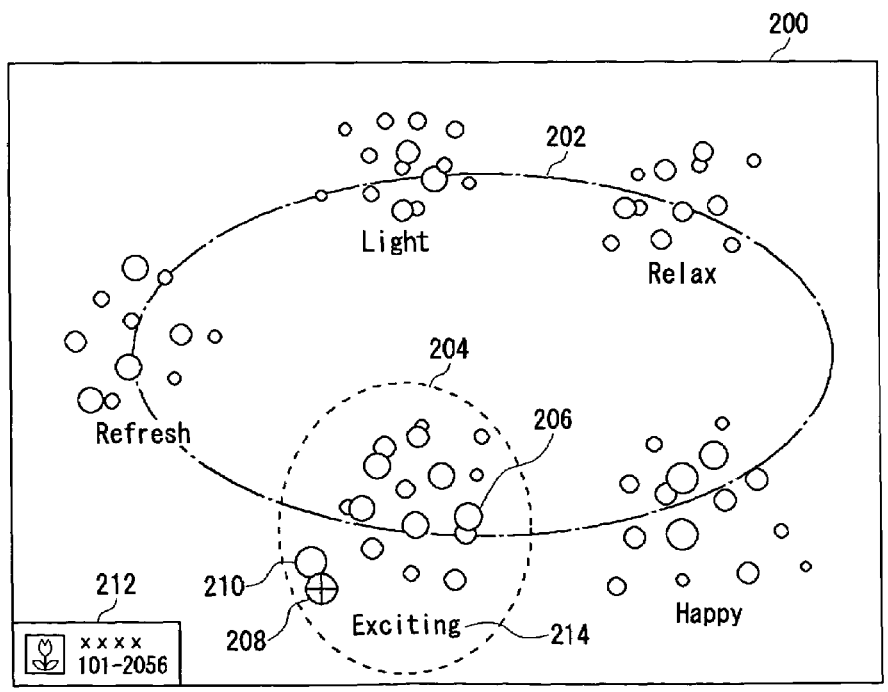
FIG. 7 shows an emotion space, which is an example of information space.

As for "emotion", digitization may not absolutely be necessary, but it may often be enough to classify the information elements into emotion clusters such as "Happy" or "Exciting". In such a case, positions within the information space are preferably predetermined for respective emotion clusters, and information elements belonging to their respective clusters are preferably disposed randomly inside a predetermined range around each of the position. One example of this is shown in FIG. 7 to be explained later. The same is applied to the attribute of "meaning".

Figure 12:
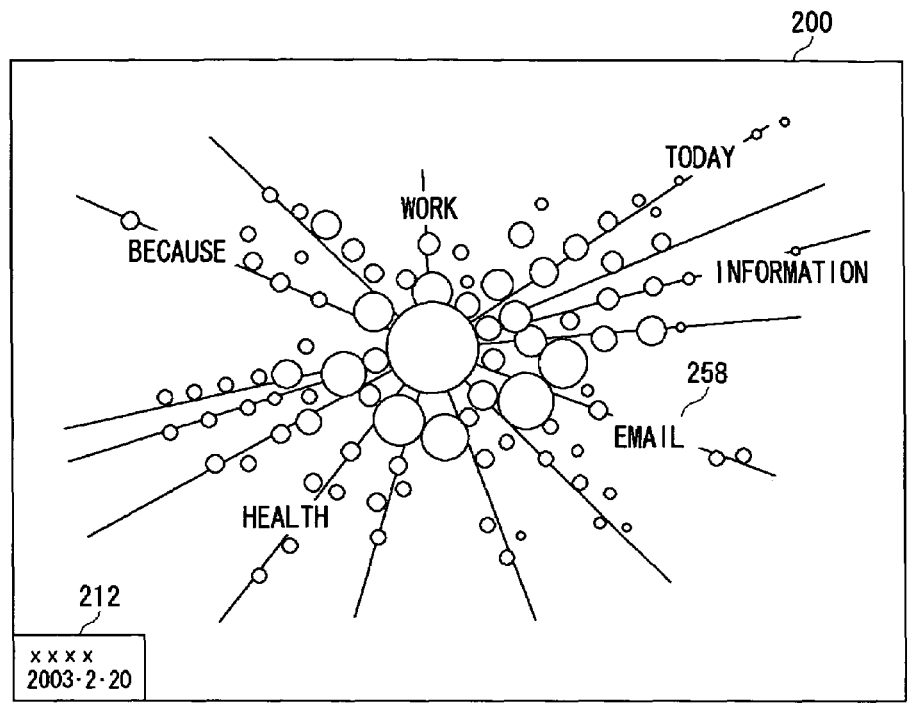
FIG. 12 shows a space based on semantic contents of text, which is a still another example of information space.

When information elements are text data such as electronic mail (Email), the text data are analyzed. "Tendency of wording" is an attribute by which to classify and position accordingly the text by the tendency of words used therein. For example, if words like "friend", "go and have a drink" or "trip" appear frequently in a text, the text will be classified into a "Happy" cluster, and texts of this type will be displayed close together. FIG. 12 to be explained later shows one example of such clustering. Digitization and assigning of attributes that do not originally exist are done, for instance, by an element attribute specifying unit 102 (described later).

Figure 4:
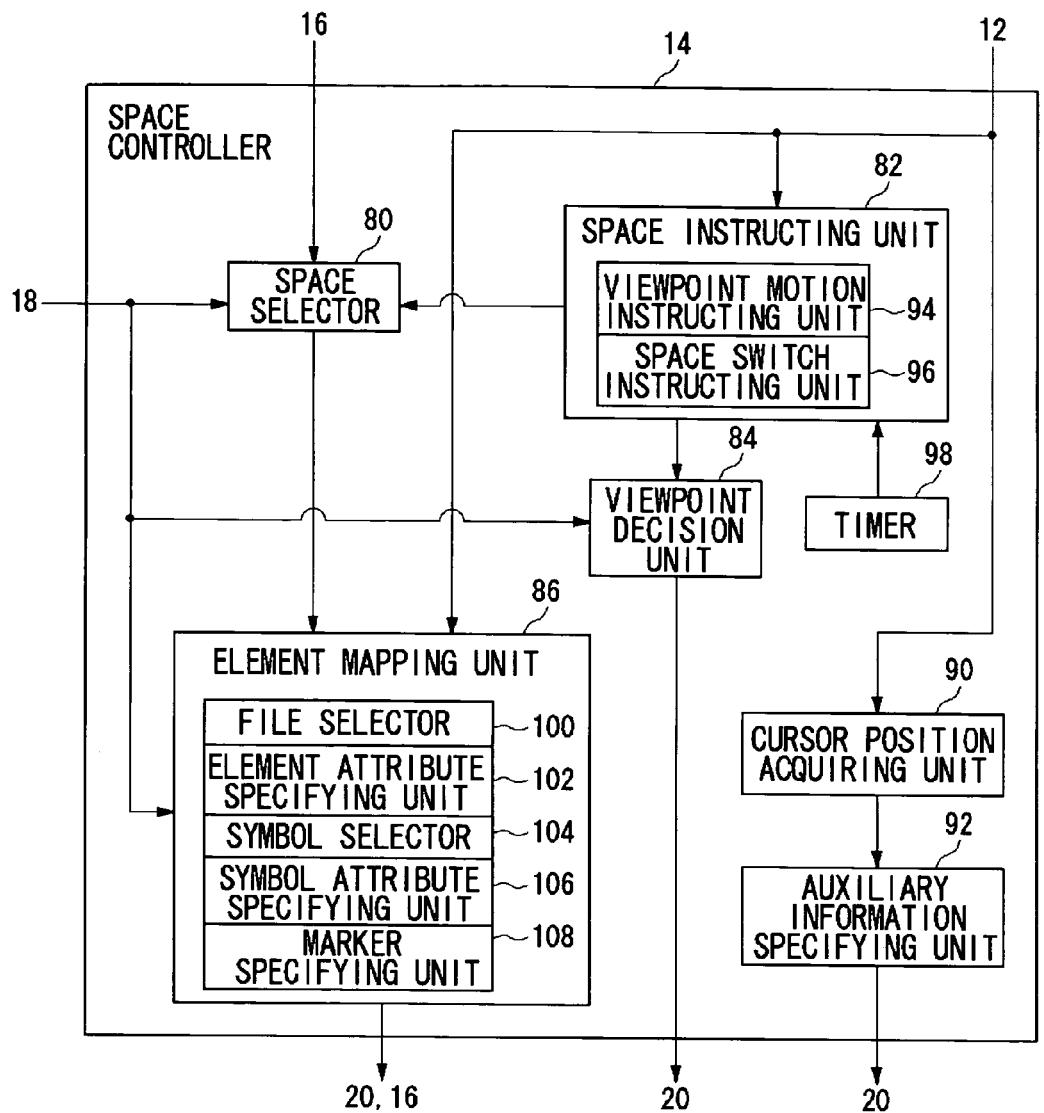
FIG. 4 shows an internal structure of a space controller in an information presenting apparatus.

FIG. 4 shows an internal structure of the space controller 14. The space selector 80 not only reads out a template of an initial space from the space template storage 40 at start-up but also reads out a template of the specified information space according to the instructions from the information selector 16. Also at space switching, the space selector 80 reads out an information space template to be used after the switching, according to the instructions from a space switch instructing unit 96. The data on information spaces thus read out are then transferred to an element mapping unit 86.

The space motion instructing unit 82 includes a viewpoint motion instructing unit 94 which instructs "cruising" to be effected by changes in viewpoint within the same information space and a space switch instructing unit 96 which instructs a switch from one information space to another. The instructions from the viewpoint motion instructing unit 94 are communicated to a viewpoint decision unit 84, and the instructions from the space switch instructing unit 96 are communicated to the space selector 80. Since the space switching is done by morphing, "morphing" as used hereinbelow includes the space switch operation as the case may be. As will be described later, cruising and morphing will be started when there has been no entry from the user for a predetermined period of time or when explicit instructions have been given from the user. A timer 98 is provided as a means for measuring time for this purpose.

The element mapping unit 86 maps information elements to an information space. As described earlier, the file selector 100 selects a file to be mapped from a genre, such as "music" or "movies". The file selector 100 accepts not only an automatic selection as default setting but also a manual selection as instructed by the user.

The element attribute specifying unit 102 in the element mapping unit 86 specifies and acquires the numerals of the attributes necessary for mapping the files of a selected genre, which are the respective information elements. At this time, the element attribute specifying unit 102 simply reads out the attributes of files, which are already digitized as mentioned above, or digitizes or classifies into clusters the attributes which are not quantified. As already described, which attributes are to be assigned to which space axes, such as X, Y and Z, is predetermined for each of information spaces.

A symbol selector 104 in the element mapping unit 86 reads out symbols for displaying information elements from the symbol storage 48. In a preferred embodiment of the present invention, small semitransparent circular objects looking like stars are used as default symbols. The semitransparency is accomplished by texture mapping. As will be described later, a concentration of stars can be displayed vaguely and integrally as a nebula or a star cluster by subjecting the semitransparent symbols to an alpha blending processing at drawing. Of course, three-dimensional objects such as balls may be used instead of two-dimensional objects like circles. With two-dimensional objects, the drawing unit 20 draws them by a known technique so that the object surface is orthogonal to the line-of-sight vector. When three-dimensional objects are to be used, it is possible to reduce the computation load at drawing if something like balls or homogeneous metaballs, which have symmetrical property, are used. This is because drawing them only requires the consideration of the distance from the viewpoint, and not the line of sight.

A symbol attribute specifying unit 106 in the element mapping unit 86 determines attributes to be given to symbols when representing information elements in symbols. For example, the symbol attribute specifying unit 106 reads out the sizes of files and decides numerical values proportional to the sizes as attributes. The numerical values thus determined are sent to the drawing unit 20, where they are used as the radii of the circles of the symbols when drawing the symbols corresponding to the files. Another attribute is the "freshness" of files. The freshness can be determined by subtracting the date and time of file preparation from the present date and time. For files with higher degrees of freshness, that is, newer files, numerical values that make the above-mentioned radius larger will be given. Or, a processing, such as "revolving", "blinking" or "periodical pulsation of radius" will be specified in the drawing and assigned thereto.

A marker specifying unit 108 in the element mapping unit 86 reads out markers to be displayed for the respective clusters of files from the marker storage 46. Markers can be made usable by having them associated with the information spaces that use them and in addition placing in the templates of the information spaces the description of the positions of the markers to be displayed therein. The structure and function of the element mapping unit 86 has been described above. Now the information acquired by the element mapping unit 86, together with the information acquired by the space selector 80, is sent to the drawing unit 20 and the information selector 16. The drawing unit 20 performs a drawing based on the information it has received, while the information selector 16 specifies the information elements contained in the marked-out space.

A cursor position acquiring unit 90 and an auxiliary information specifying unit 92 are the components designed to display auxiliary information concerning information elements (hereinafter referred to simply as "auxiliary information") based on the cursor position within the screen. The cursor position acquiring unit 90 acquires the cursor position within the screen by the use of a known technique, such as OS (operating system) and converts the coordinates thereof in the screen into the coordinates in the information space. It is to be noted, however, that since the cursor position has only two-dimensional information of the screen, the information thereon in the direction orthogonal to the screen gets degenerated. Accordingly, the cursor position acquiring unit 90 degenerates the information in the vertical direction on the displayed information elements also, calculates the distance on the screen between the information elements and the cursor position, and identifies the information element closest to the cursor.

The auxiliary information specifying unit 92 reads out the details of the specified information element, or file, from the attributes or the like thereof and sends them to the drawing unit 20. As will be described later with reference to FIG. 7, the auxiliary information is displayed in an auxiliary information box 212. While moving the cursor, the user can see the auxiliary information and guess the general locations of different types of files in the information space. This ensures the effectiveness of volume cutout in the "loose search".

Figure 5:
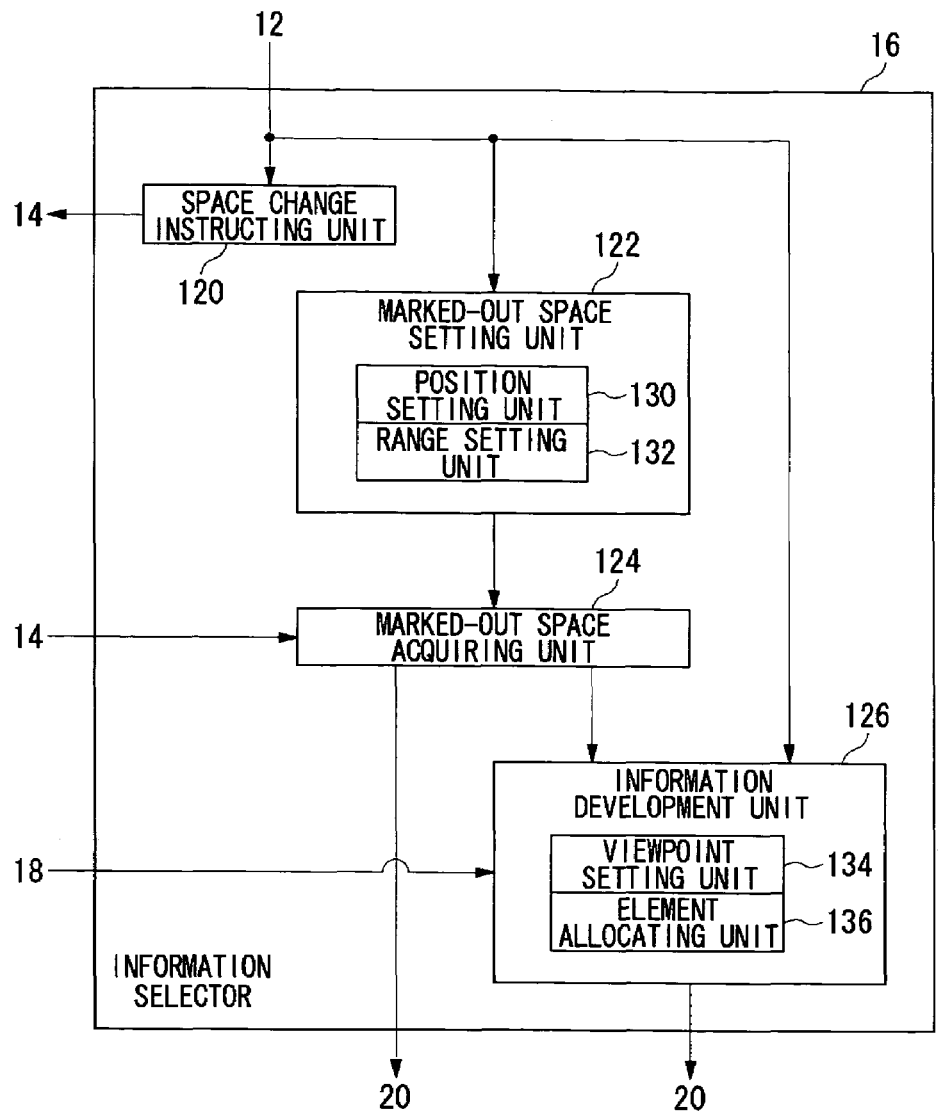
FIG. 5 shows an internal structure of an information selector in an information presenting apparatus.

FIG. 5 shows an internal structure of the information selector 16. A space change instructing unit 120 receives instructions on space change from the user and notifies the instructions to the space selector 80 in the space controller 14. The space change instructing unit 120 is provided within the information selector 16 because space change by the user is often done with the purpose of information search.

A marked-out space setting unit 122 performs the processing of volume cut-out by which the user conducts "loose search" within the displayed information space. The interior of the volume is the marked-out space. The volume is cut out in a form like a marked-out space 262 shown in FIG. 16 described later. Assume that it is spherical according to a preferred embodiment of this invention. The center of a marked-out space is set by the cursor position, while the radius thereof is specified by the user's mouse or other button operation. For example, there may be interface such that a continuous depression of a button keeps the radius growing and the release of it determines the radius. In any case, a position setting unit 130 acquires the center of a marked-out space, and the range setting unit 132 acquires the radius thereof, and these data are sent to a marked-out space acquiring unit 124.

The marked-out space acquiring unit 124 specifies the information elements contained in the marked-out space (hereinafter referred to also as "marked-out elements" or "marked-out files") based on the center and radius data received and the mapping information on the information elements received from the element mapping unit 86 and then conveys them to the information developing unit 126. Furthermore, to enable the drawing of the marked-out space, the marked-out space acquiring unit 124 sends to the drawing unit 20 the three-dimensional data concerning the part contained in the marked-out space out of the original information space.

A viewpoint setting unit 134 in an information development unit 126 reads out, as a template, a space image to be displayed at information development from the information development template storage 60 and also a viewpoint from which to display it from the information development viewpoint storage 62, and sends the template and the viewpoint to the drawing unit 20. On this template is a description of a curve whereby marked-out elements are so disposed as to be able to progress one-dimensionally (hereinafter referred to as "element progression line", which is equivalent to an element progression line 270 of FIG. 17). An element allocating unit 136 determines how the marked-out elements are to be allocated on the element progression line and communicates the arrangement to the drawing unit 20. When there are n marked-out elements, the element allocating unit 136, for instance, determines the allocation thereof by dividing the element progression line linearly or nonlinearly into n sections.

Figure 6:
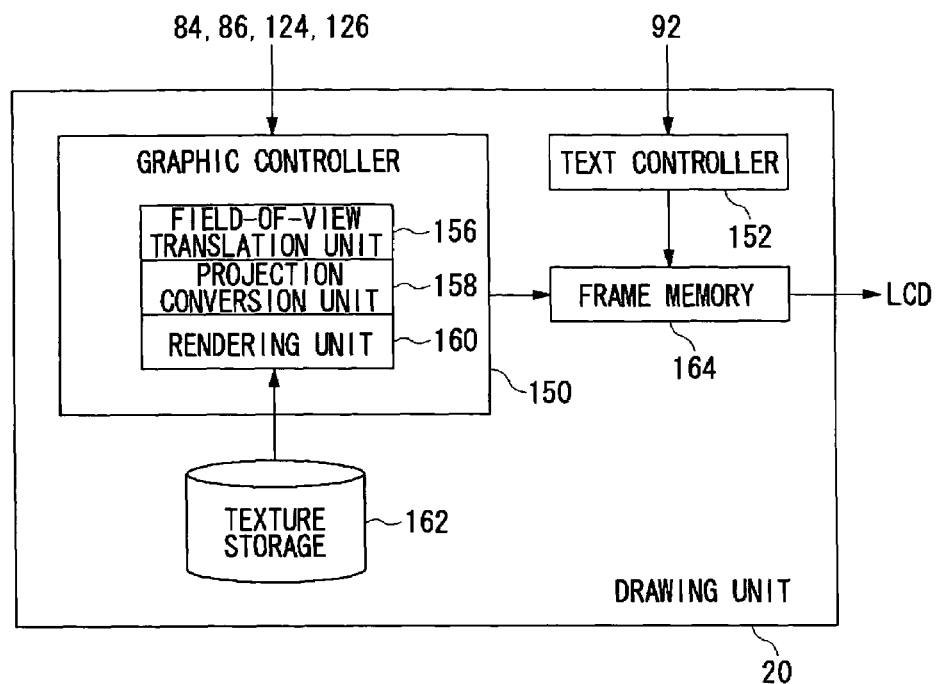
FIG. 6 shows an internal structure of a drawing unit in an information presenting apparatus.

FIG. 6 shows an internal structure of a drawing unit 20. The drawing unit 20 mainly includes a graphic controller 150, a text controller 152, a texture storage 162 and a frame memory 164. Display contents from the graphic controller 150 and the text controller 152 are synthesized in the frame memory 164, and the display data are sent out to an LCD or other display device. Between the frame memory 164 and the display device, there may be a known display signal generating circuit, which is not shown here, and in such a case the circuit outputs signals in a format suitable for the display device.

The graphic controller 150 is comprised of a field-of-view translation unit 156, a projection conversion unit 158 and a rendering unit 160. According to the viewpoint of drawing, the field-of-view translation unit 156 performs field-of-view translation or viewing conversion on the world coordinate data on the three-dimensional model of the space to be displayed, such as information space or marked-out space, and the world coordinate data on the information elements to be allocated in this space. Thereafter, the clipping (not shown) is done, as necessary, by a known technique. Then, the projection conversion unit 158 projection-converts the data into a screen coordinate system. The rendering unit 160 reads out, as appropriate, semitransparent or other texture necessary for the drawing of information space or symbols from the texture storage 162 and performs a drawing using a known technique. The result of the rendering is stored in the frame memory 164.

On the other hand, the text controller 152 acquires text data necessary for the display of auxiliary information from the auxiliary information specifying unit 92 and stores them in the frame memory 164 in a manner such that the data overwrites the display data from the graphic controller 150 with the result that the text data are displayed in a predetermined position on the screen. So far, the structure of an information presenting apparatus 10 according to the present embodiments has been described.

Hereinbelow, typical screens of an information presenting apparatus 10 will be shown. FIG. 7 illustrates a screen 200 showing a space and information elements drawn therein when an "emotion space" is selected as the information space. As can be seen from FIG. 7, the template of emotion space has a loop-shaped axis 202 by which to arrange various emotions. Arranged on this axis 202 are different types of emotion classified into clusters of "Light", "Relax", "Happy", "Exciting" and "Refresh". For example, shown in the "Exciting" cluster 204 are the files 206 and 210 of exciting pieces of music, each represented by a circular symbol with a radius corresponding to the file size. The auxiliary information on the file 206 closest to the cursor position 208 is being displayed in the auxiliary information box 212. Also being displayed is a marker 214 of this cluster, which is "Exciting".

When this emotion space is being displayed, a cruising in this space will be started if there is no entry from the user for a predetermined period of time. This feature provides an environment in which the user, even in a passive stance, may be able to search for or obtain information. The cruising is realized as the viewing position changes along the above-mentioned motion path. In the case of FIG. 7, if, for instance, the viewpoint is moved a certain distance away from but still along the axis 202, then images like cruising images taken from an aircraft making the rounds of the clusters will be obtained. A structure may also be such that when the cursor is moved, the viewpoint motion instructing unit 94 stops the motion of the viewpoint, namely cruising, following the instructions from the cursor position acquiring unit 90. The motion of the cursor can be recognized as the start of the user's search for an information element, and therefore this structure is designed to stop the motion of the viewpoint so as not to interfere with the search operation of the user.

Figure 8:
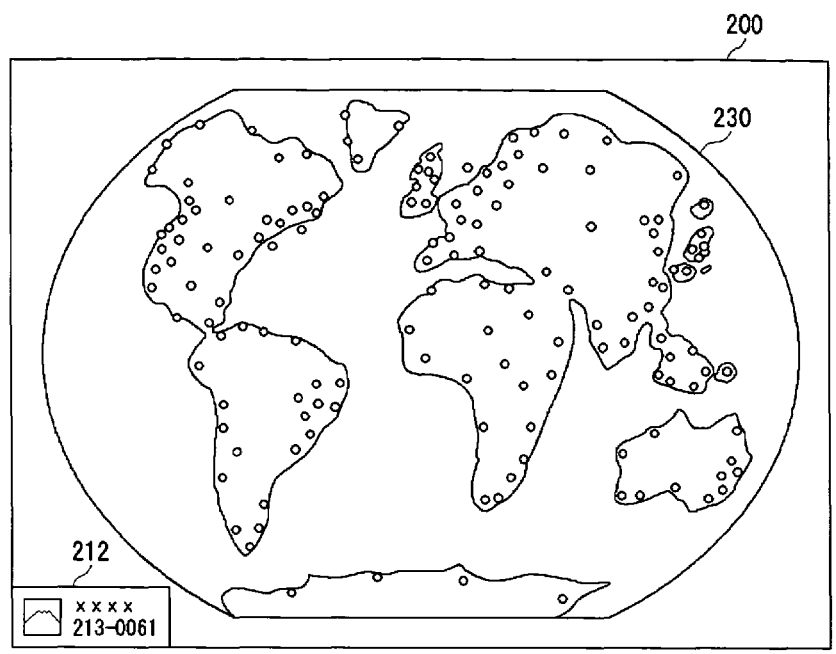
FIG. 8 shows a world map, which is another example of information space.

On the other hand, if the user instructs a space change via a mouse or other input device, then the display will, for instance, switch to a space 230 shown in FIG. 8, which is a world map as seen from the sky. At this time, morphing is performed between the images of FIG. 7 and FIG. 8. The morphing will involve both "change in information space" and "motion of information elements". The former may be accomplished simply by switching the two spaces by alpha blending, but a better effect will be achieved if the corresponding points of the two spaces are determined beforehand and interpolation is carried out for the corresponding points both in position and pixel value. A full-scale morphing using the corresponding points may be realized by placing corresponding point information in the space template storage 40, for instance, which is to be notified to the drawing unit 20, and in addition providing a corresponding point interpolating unit (not shown) in the drawing unit 20.

Next, the motion of information elements may be accomplished by performing the following procedure. In the information space of FIG. 7, a position P1 occupied by a file is first specified. Then, a position P2 occupied by the same file in the information space of FIG. 8 is specified. Finally, the symbol corresponding to this file is moved through interpolation from the point P1 to the point P2. And this processing can be applied to all the files concerned. The motion paths determined by such interpolation are stored in the element motion path storage 44. These motion paths may be described in a format dependent on P1 and P2.

Figure 9:
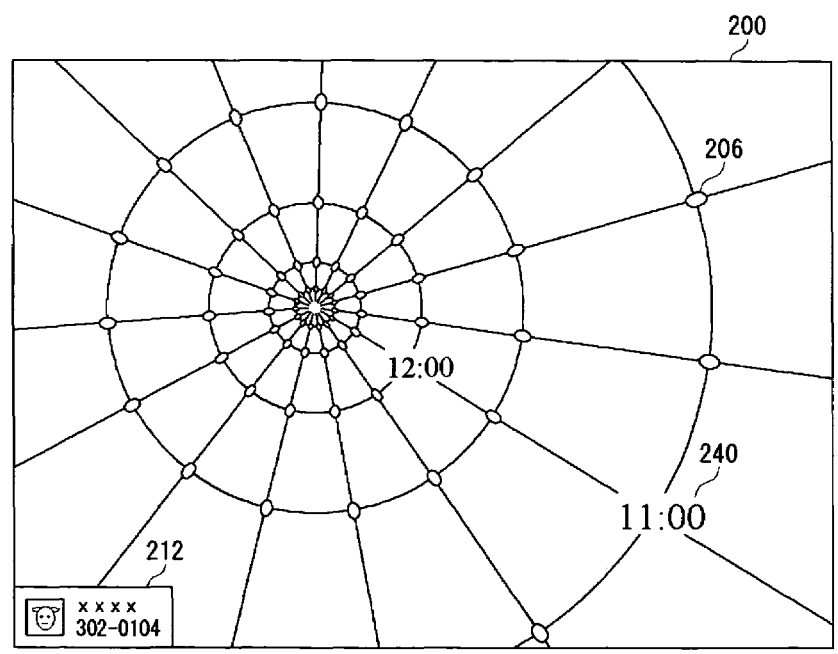
FIG. 9 shows a time tunnel, which is still another example of information space.

FIG. 9 illustrates a screen 200 of a time tunnel, which is another example of information space. Now the viewpoint is in the center of a tunnel and the line of sight is toward the depth of the tunnel. The background is assumed to be dark-colored outer space, and the file 206 is represented by a star-like symbol. Here the file 206 is assumed to correspond to a TV program. And it is further assumed that at a click on this symbol, the recording of this program is set or the preview or other outline file of this program is started. The axes of this space are time, and the files are arranged according to the starting hour 240 of their corresponding programs. In FIG. 9, for instance, there is an arc at the starting hour 240 of "11:00", and a plurality of files on this arc all have the starting hour of "11:00". The positions on the arc can represent, for instance, broadcasting stations, genres of programs, or some other arbitrary attribute.

Figure 10:
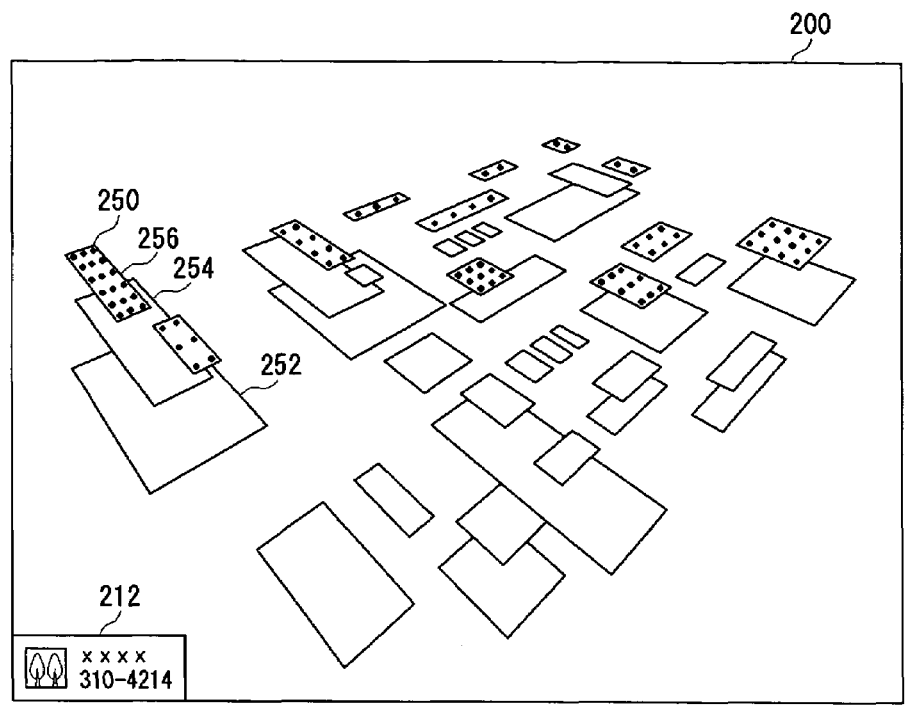
FIG. 10 shows a hierarchized file storage space, which is still another example of information space.

FIG. 10 illustrates a screen 200 of a hierarchized file storage space, which is still another example of information space. Here, too, the background is assumed to be dark-colored outer space, and the spaces to store files are each represented by a plate-like space. Each of the spaces is actually a folder, and the area of each space is proportional to the number of files contained in the folder. In this example, there are a space 252 (called the first space), a slightly smaller space 254 (called the second space) above the first space, and a much smaller space 256 (called the third space) above the second space. These correspond to the positions or levels of folders in the hierarchy, which means that the folder, which is the first space 252, contains the folder, which is the second space 254, and that the folder, which is the second space 254, further contains the folder, which is the third space 256. And stored in the third space 256 is a file 250. The file 250 is symbolized as a small round dot. Moreover, the spaces, which are the drives containing their respective folders, may be distinguished from one another by different colors or other modes.

The axis of this information space is the "depth in a hierarchy". Therefore, the spaces on the same level in a hierarchy exist at the same depth, or in the same plane. Where in the same plane the spaces belonging to the same level in a hierarchy are to be positioned may be determined based on the attributes of the folders corresponding to the respective spaces. Such attributes of the folders may include the number of files contained or the number of sub-folders contained therein, in addition to the attributes already mentioned with files. It is to be noted here that this information space is thought of as a three-dimensional representation of a tree structure of information.

Figure 11:
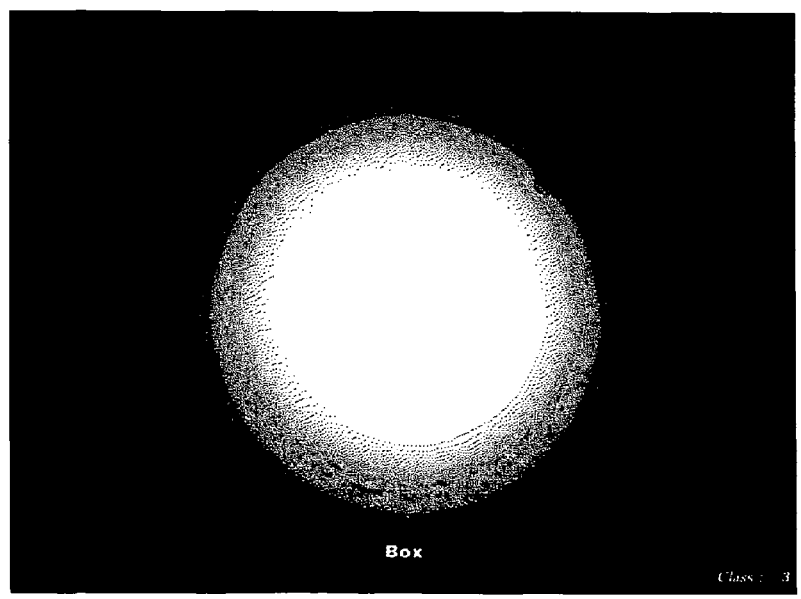
FIG. 11 shows a star cluster and its surrounding space, which is still another example of information space.

FIG. 11 illustrates a screen 200 of a star cluster and its surrounding space, which is still another example of information space. In this space, polar coordinates with a point as the origin are used, and one of the attributes of files is represented by a distance r from the origin. θ and φ, which are the remaining two axes, may be used to represent the other attributes of files, but, when such strict classification as this is not required t, files with the same distance r may be distributed randomly over the same spherical surface. In any case, this space works quite effectively when there are an extremely large number of information elements. The reason is because a generally vague space can be presented with semitransparent information elements drawn on top of each other, and as a result, the user does not have to face the reality of too many choices and alternatives. Furthermore, it is this rendering of information elements in an integrated and indivisible manner that allows the volume cut-out in "loose search" to gain real meaning. The vague drawing of the information elements has also an advantageous effect of absorbing the difference in resolution between display devices.

FIG. 12 illustrates a screen 200, which is a modified example of the information space shown in FIG. 11. Here, arranged on each of a plurality of lines radially extending from a center are files which are supposed to have the same or similar meanings (hereinafter referred to also as "analogous files"). Accordingly, this space is equal to the polar coordinates of FIG. 11 when the same θ and φ are given to analogous files. In FIG. 12, the information elements are texts placed in Email or Electronic Bulletin Board. If words or frequently appearing keywords, such as "work", "information", "health" or "Email", in the text of Email or the like are found to be the same or similar by morphological analysis mentioned above, the element attribute specifying unit 102 decides that such texts containing them have a similar meaning or message and places them on the same radial line. The radial lines may be colored so as to draw the user's attention to the axes, and the meanings and the change in them may be indicated by the use of different colors or their gradation. In FIG. 12, keywords 258 are displayed for their respective radial lines as markers. This information space proves useful, for instance, when news or opinions posted on an electronic bulletin board are to be grouped to help the user grasp or classify them intuitively.

Figure 13:
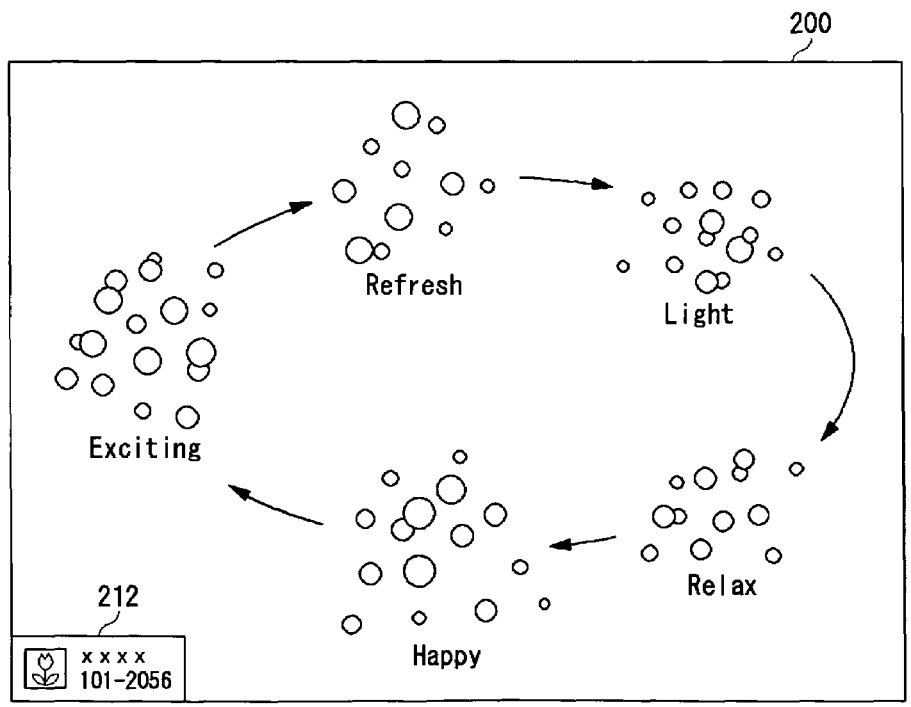
FIG. 13 shows how a cluster of emotion in the emotion space shown in FIG. 7 moves.

Although the appearance of a different information space at the switching of information spaces has been explained with reference to FIG. 7, "shift" within the same information space may also be supported as shown in FIG. 13. In this example, the clusters in this emotion space are rotated along the axis according to user operation. For example, when the user is in search of a "Happy" piece of music, the search can be accomplished with ease by rotating the cluster until it comes to the front center of the screen as shown in FIG. 13. Hereinbelow, the "shift" within an information space is also expressed as "switching of information spaces", and it will be realized by various structures for switching information spaces.

Figure 14:
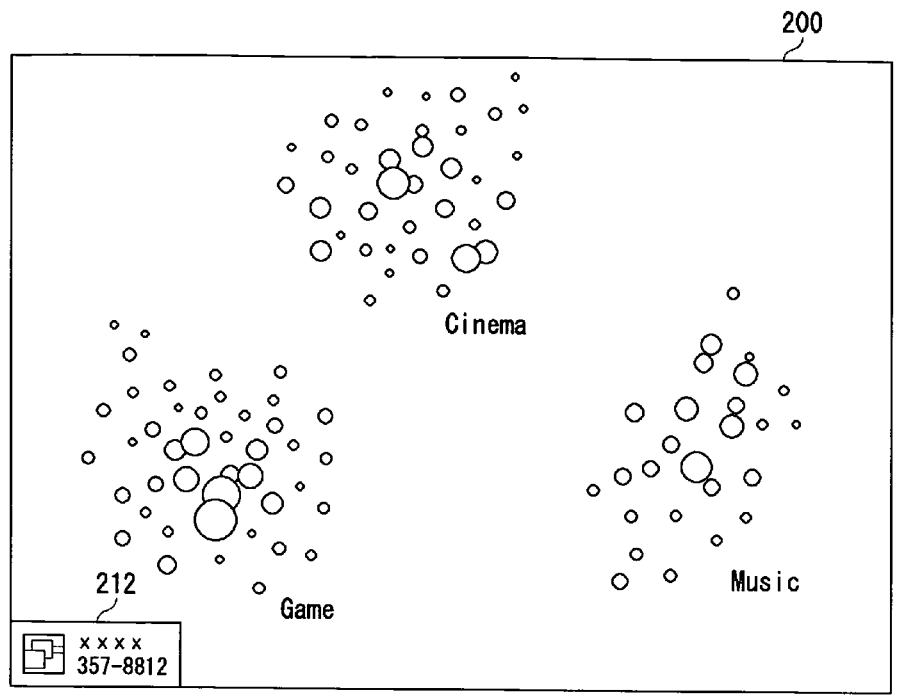
FIG. 14 shows an information space, based on genres of files, which is varied from the emotion space shown in FIG. 7.

A drastic change in information space from FIG. 7 to FIG. 8 has been explained in the description of morphing. Yet, it is not always necessary that the information space be changed in a way conspicuous to the user. For example, if the shifting of files only within the same appearance of information space is to be produced, a morphing of the information space of FIG. 7 to that of FIG. 14 may suffice. Though FIG. 14 is a space in which files are classified into clusters based on genres such as "Cinema", the user receives an impression of its very close similarity to that of FIG. 7 because the outer space is imitated, the files are collectively arranged for each cluster and so forth. Hence, by morphing between FIG. 7 and FIG. 14, the impression can be produced in which only the symbols fly about before they are regrouped. Hereinbefore, the examples of information spaces and their modifications have been described. Now, the procedure for actually searching information will be described hereinbelow.

Figure 15:
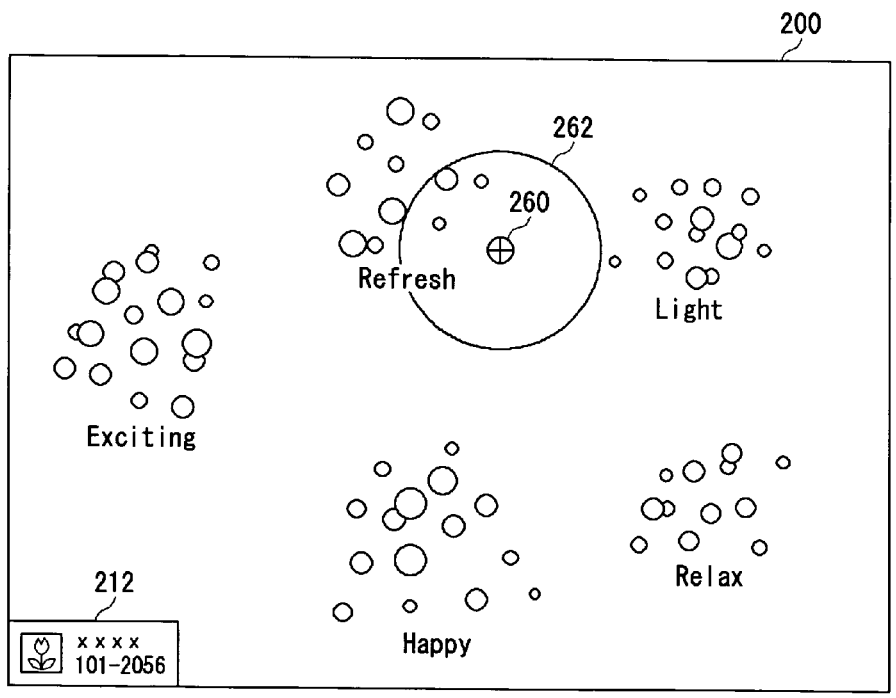
FIG. 15 shows how a marked-out space is specified in the emotion space shown in FIG. 7.
Figure 16:
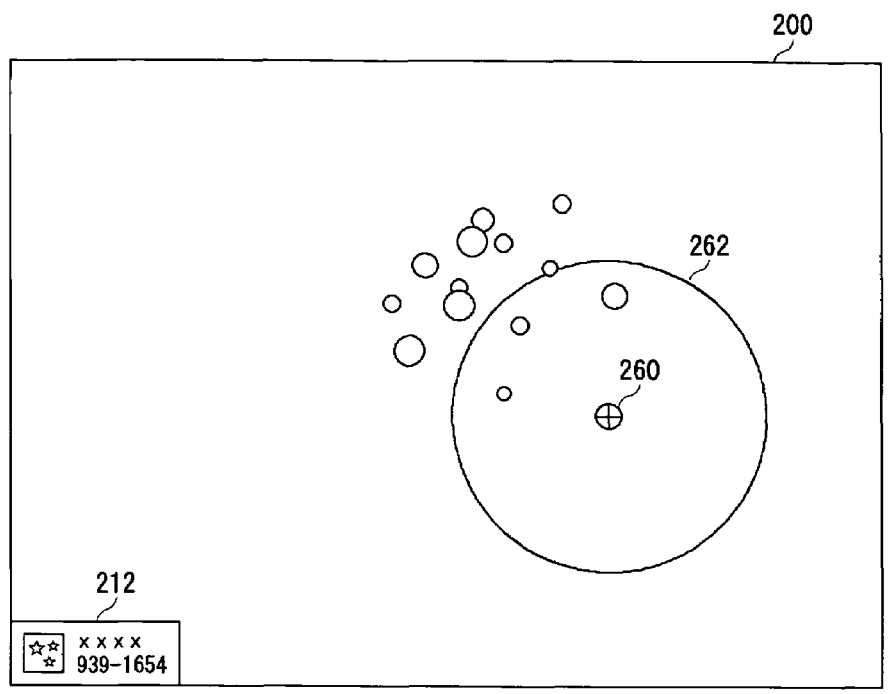
FIG. 16 illustrates a state of assigning a new marked-out space by enlarging the marked-out space obtained in FIG. 15.

FIG. 15 shows an instance of designation of a marked-out space in "loose search". The user has defined a marked-out space 262 by positioning a cursor 260 near the "Refresh" cluster and setting a desired radius around it. FIG. 16 illustrates a state of defining a new marked-out space 262 by again placing the cursor 260 in a new position in the marked-out space obtained in FIG. 15. In this manner, the volume cut-out for a marked-out space is repeated a number of times until finally the number of information elements contained in the marked-out space drops below a predetermined number. At this point, the search is shifted to "accurate selection" mode with information development started by the information development unit 126.

Figure 17:
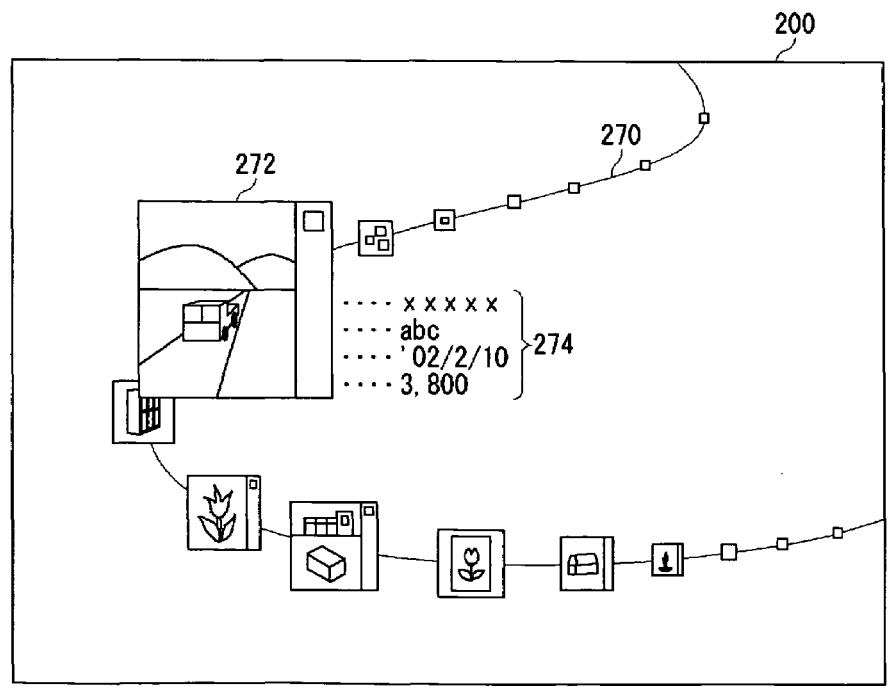
FIG. 17 shows a space in which a file is information-developed to execute an accurate selection.

FIG. 17 illustrates a file 272 which is information-developed on an element progression line 270. One of the plurality of files which has come to a predetermined position is displayed in an enlargement, and detail information 274 is added there. Here a music file, a game jacket or the like is displayed in an enlargement so as to aid the user in his/her final selection of a file. Moreover, if information development templates and GUIs are so designed that a plurality of files are made to advance on the element progression line 270 by user operation, then the user can closely check the files one by one.

The search procedures have been described. Hereinafter, processing procedures according to present embodiments will be described with reference to flowcharts.

Figure 18:
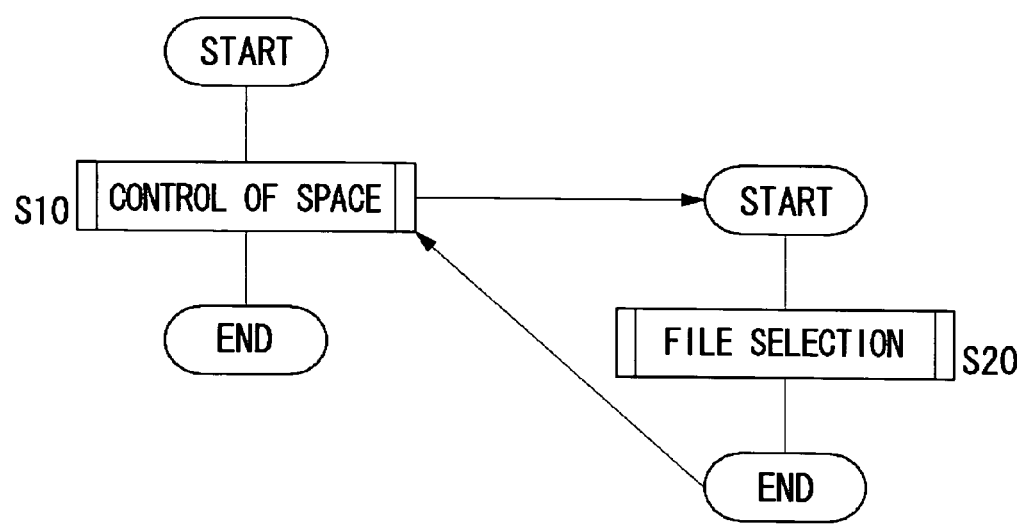
FIG. 18 shows an overall procedure for searching information elements according to an embodiment of the present invention.

FIG. 18 shows an overall processing procedure according to a present embodiment. With the start of the information presenting apparatus 10, control of information space (described in FIG. 18 as "space" for short) is started (S10). In the meantime, file selection is carried out as an interrupt processing (S20).

Figure 19:
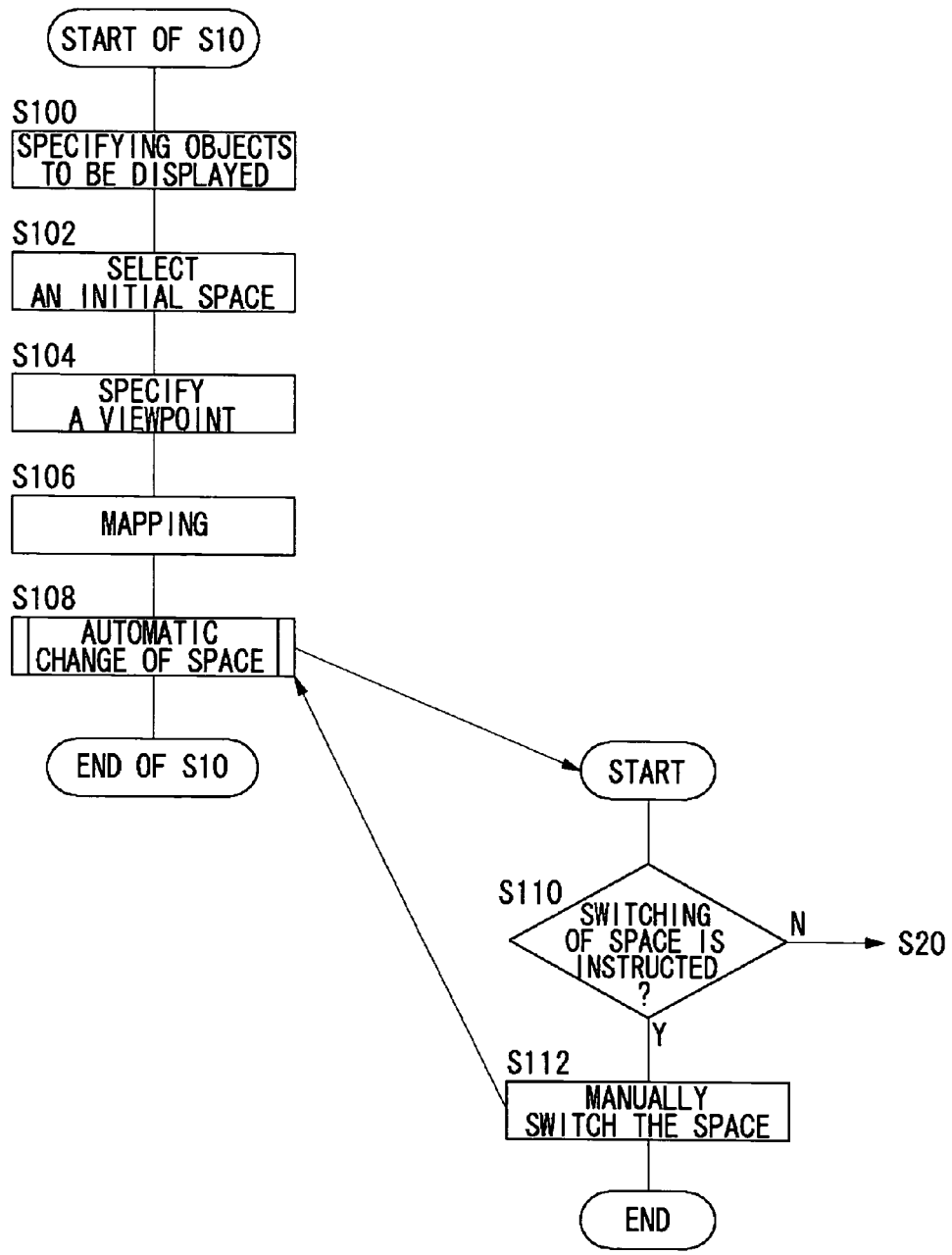
FIG. 19 shows a detailed procedure of S10 in FIG. 18.

FIG. 19 shows a detailed procedure for controlling the information space (S10). First the file selector 100 specifies objects to be displayed as information elements (S100), and the space selector 80 selects an initial space (S102). The viewpoint decision unit 84 specifies a viewpoint for drawing (S104). After this, or simultaneously with this, the element mapping unit 86 carries out a mapping of information elements (S106). The selected information space and the results of mapping are notified to the drawing unit 20 for drawing, and an automatic change processing of information space is started (S108).

If there occurs an interrupt processing by the user during this processing, a decision is made on whether the operation is instructing the switching of information spaces or not (S110). It is assumed here that the user operation is instructing either the switching of information spaces or the search for information elements. If it is the switching of information spaces (Y of S110), then information spaces are switched by manual operation of the user (S112) and a return is made to S108, which is again a background processing. On the other hand, if it is the search for information elements at S110 (N of S110), the processing of S20 is started.

Figure 20:
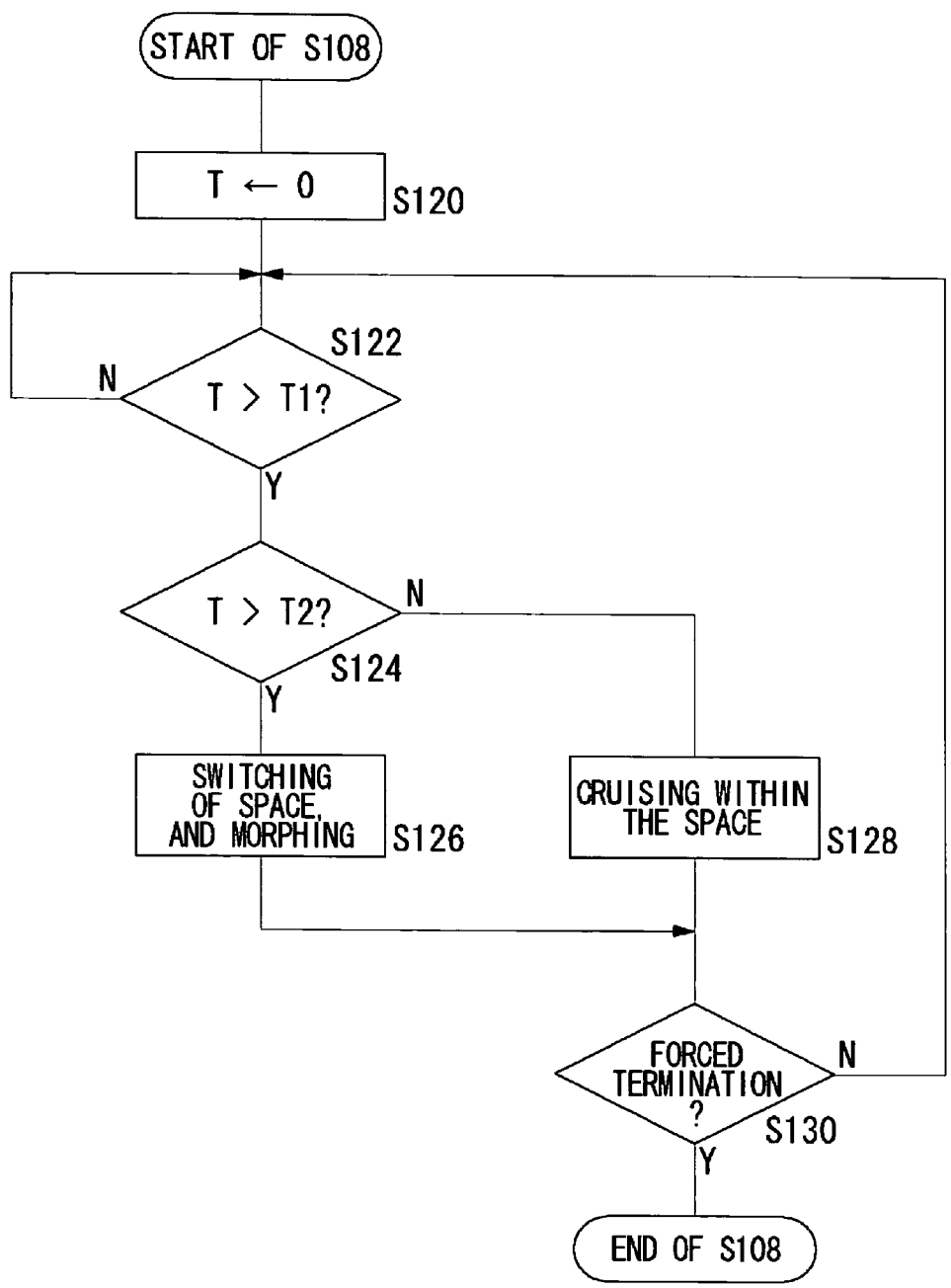
FIG. 20 shows a detailed procedure of S108 in FIG. 18.

FIG. 20 shows a detailed procedure for automatically changing information space (S108). First the count of time T on the timer 98 is cleared to zero (S120). Then, while there is no interrupt, the timing is waited for when the count T exceeds a first threshold value T1 (S122). When T>T1 (Y of S122), and as long as T1<T<T2 (N of S124) (T2 being a second threshold value larger than T1), a cruising in the information space is performed (S128). The cruising continues as long as there is no forced termination by the user (N of S130). On the other hand, if T>T2 at S124 (Y of S124), a switching of information spaces and morphing are done instead of cruising (S126). The order of switching may be either predetermined or randomized. It is to be noted here that when T>T2, a resetting of T=0 is made if the state is to be shown to the user for a while after the switching of the information spaces. On the other hand, a setting of T=T1+1 is performed if an auto cruise is to be operated immediately after the switching of the information spaces. The switching of information spaces, too, continues as long as there is no forced termination by the user (N of S130).

Figure 21:
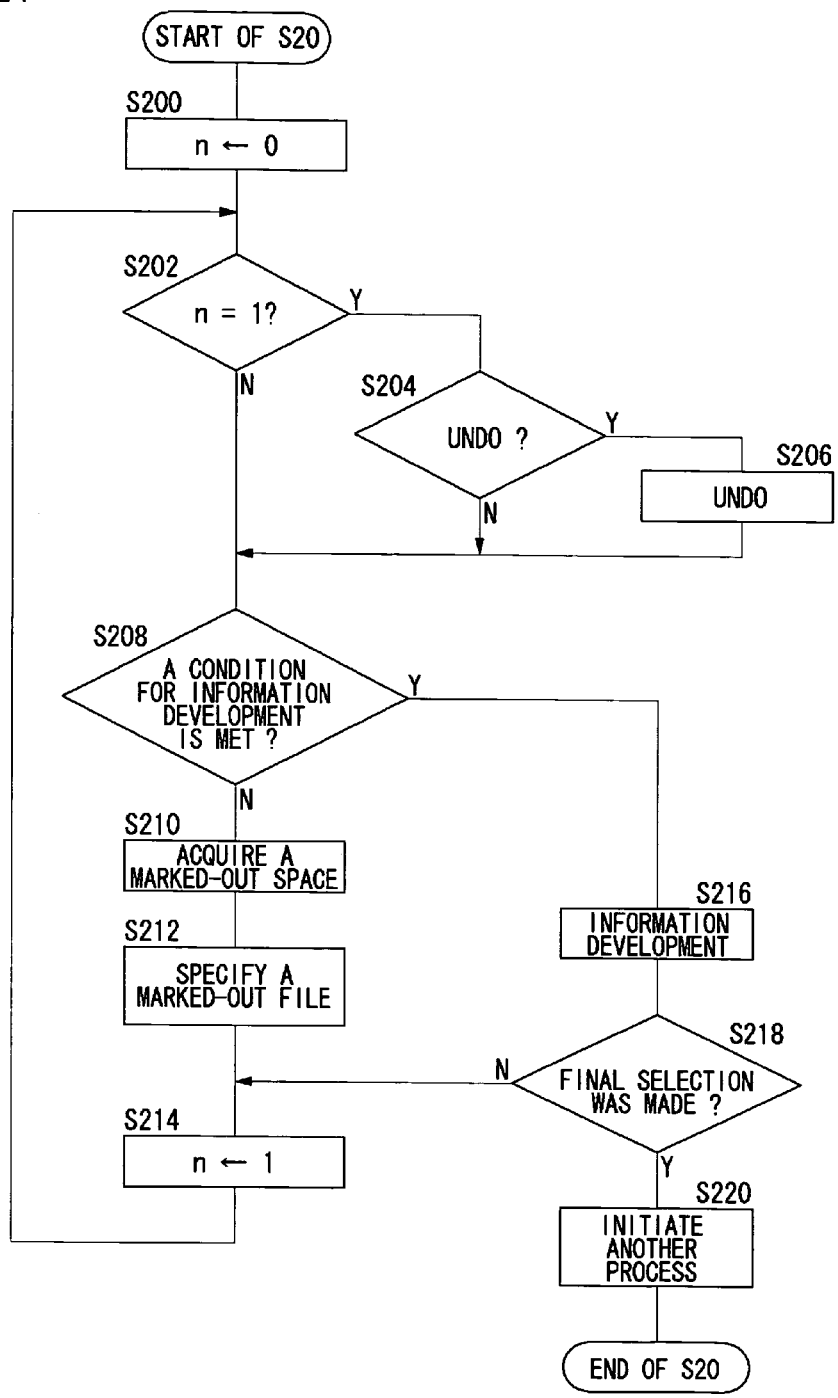
FIG. 21 shows a detailed procedure of S20 in FIG. 18.

FIG. 21 shows a detailed procedure for file selection (S20). First the flag n, which is to be "0" for no cut-outs of marked-out space or "1" for once or more of them, is cleared to zero (S200). Then a decision is made on whether n=1 or not. But since n=0 initially, the processing jumps to S208 (N of S202).

At S208, a decision is made on whether the conditions for information development have been met. The conditions for information development include, for instance, "the number of information elements dropping below the predetermined number by the setting of a marked-out space". When the conditions for information development are not met (N of S208), a marked-out space is set and obtained by the user again (S210), the information elements contained in the marked-out space, namely, marked-out files or files of interest, are specified and recorded (S212), and a return is made to S202 by setting "1" in the flag n (S214). The marked-out space is recorded so as to enable a reset to the previous condition by an undo processing to be described below.

At S202, since condition n=1 is met this time (Y of S202), a shift is made to S204. Assuming the case where the setting of the marked-out space has been incorrect, an inquiry is made to the user as to whether "undo" is to be done or not. Upon a response of "undo" (Y of S204), the setting of the marked-out space is cancelled and the state is returned to a state which is immediately prior thereto (S206), and a step is returned to S208.

At S208, a decision is made on whether the conditions for information development have been met or not. If the conditions for information development have been met (Y of S208), an information development is performed by the information development unit 126 (S216) and a decision is made on whether the user has finally selected a file or not (S218). And if the user has not finally selected a file (N of S218), a step is returned to S214. On the other hand, if the user has finally selected a file (Y of S218), the series of processing is completed by starting a program to reproduce the selected file or starting some other process (S220).

The present invention has been described based on the embodiments which are only exemplary. It is understood by those skilled in the art that there exist other various modifications and such modifications are encompassed by the scope of the present invention. Such modified examples will be described hereinbelow.

In FIG. 1, the information presenting apparatus 10 is structured by the operation unit 12, the space controller 14, the information selector 16, the storage 18 and the drawing unit 20. However, the information apparatus 10 may be structured, for instance, such that the space controller 14 and the storage are combined together, the space controller 14, the information selector 16 and the information selector 16 are combined together, the space controller 14, the information selector 16 and the drawing unit 20 are combined together or the like.

The storage integrally contains the space control related data storage 30, the information selection related data storage 321 and the elements storage 34. However, for instance, the element storage 34 may be provided separately from other units, so that the thus separated element storage 34 may belong to a server side. In that case, the space control related data storage 30 and the information selection related data storage 32, which do not particularly require the updating processing, are kept locally so as to reduce the communication traffic and at the same time accessing a further increased number of files can be facilitated.

In FIG. 4, the space controller 14 is provided with various function blocks. However, as long as the functions of the space controller 14 are achieved, the provision of the cursor position acquiring unit 90 and the auxiliary information specifying unit 92, for instance, is not essential and may be omitted. The timer 98 may be provided externally. As for the element mapping unit 86, if some default arrangements are made in advance, the provision of the file selector 100 and/or the symbol selector 104, for instance, will not be necessary. The symbol attribute specifying unit 106 and the marker specifying unit 108 need not be provided if the specifications set forth in the information presenting apparatus 10 as a product does not require such units.

In the marked-out space setting unit shown in FIG. 5, a ball is assumed as a marked-out space. However, the shape thereof may be arbitrary of course and it may be a rectangular parallelepiped (a box), a cubic object having free-form surface and so forth. If the information space is two-dimensional, it is preferable that the marked-out space thereof be cut out by an arbitrary two-dimensional form. In that case, too, it is expressed as being "cut out by a lump of volume" in this patent specification.

In the present embodiments, whenever a space is cut out as a marked-out space, the thus cut-out space is magnified so as to represent a marked-out file in an explicit manner. However, the marked-out file may be explicitly represented by displaying it in color and mode different from those of the other files, regardless of whether it is magnified or not.

The information development unit 126 carries out an information development by a one-dimensional element progression line. However, the information may of course be developed and expanded two-dimensionally or three-dimensionally.

In the present embodiments, the cruising within the information space is started in the event that no operation is activated by the user. However, a modified example may be structured such that the cruising within the information space is also started when a specific instruction is given by the user similar to the case of switching the information space.

In the present embodiments, when no user operation is activated, the cruising and then the switching of information space are started up in this order. However, the order in which these occur may be reversed in the light of image effects. Alternatively, a randomized processing may be adopted where only one of the cruising and the switching of information space is generated with a certain probability.

With the user operation, the space motion instructing unit 82 may intercept or reverse-reproduce the morphing performed at the cruising or the switching of information space. For example, suppose that the morphing is stopped in the middle, and then two pieces of information are compared and viewed accordingly. Thus, the respective pieces of information in it can be viewed from different and diversified points so as to support the users even in the case when it is hard to pinpoint the desired information with a single index. If the morphing is reproduced in the reverse order, the information space is returned to an information space which is immediately prior to it, and the information can be searched there. Also, the user can use enjoyably the information space immediately prior thereto as a screen saver, for instance, which is a simpler use of this modified example.

In FIG. 21, the flag n for the undo processing is treated as being binary. However, this flag may be converted to a counter so as to be counted up every time the marked-out space is cut out and thereby the recording may be done in a manner such that the marked-out space is associated with the count value. In this case, a multiplicity of undo processings can be performed.

Depending on the type of file or the purpose of a search by a user, the two-stage process consisting of "loose search" and "accurate search" in the present embodiment may not be best suited thereto. For example, when a business-related file having a specific name is to be searched, the conventionally general way of listing and displaying it instead of using the method according to the present embodiments will be necessary and sufficient. Hence, it is useful to provide a function of switching an arbitrary stage in the present embodiments to the conventionally general method of searching files. In such a case, it is preferable that a structure therefor be such that the function of the space change instructing unit 120 as shown in FIG. 5 is expanded so as to receive not only the instruction for changing the information space but also an instruction for changing the file search method.

In addition to the present embodiments described above, a concept of normalization may be implemented. For example, when a certain information space is of rectangular coordinate system defined by the normal X, Y and Z axes, the element attribute specifying unit 102 may adjust information elements in such a manner that the information elements lie within the range of [0, 1] of each axis. In that case, a set of luminous bodies is displayed by a cube in the information space.

According to the present embodiments, when the information elements are arranged in the emotion space, each of the information elements is given "hilarious" or other attribute. If the user carries this out actively, it is speculated that the user's power of appreciation or sensitivity is reflected in the arrangement completed. Thus, for example, a drawing result obtained from an attribute which is given by a famous movie critic may be posted on a network. Alternatively, a business scheme may be established where the closeness between the thus obtained drawing result and that obtained from each user is evaluated so as to judge the power of user's appreciation. The determination of the closeness is preferably based on the sum of distance, indicative of how far they are apart from each other, between the information space for a user and that for a critic for the same file.

Though various types of information spaces have been described in the present embodiments, a plurality of information spaces may be integrally utilized for a single search. This enhances the effect by which "a longing for the search is aroused in the user". For example, to search for a movie the user wants to see, the movies are classified into clusters such as "Happy" in the emotion space shown in FIG. 7 and they are arranged in each cluster according to the production year and the country that produces the movie. In the space of world map shown in FIG. 8, the movies are arranged according to the country where the movie was produced or the country which the leading actor/actress comes from. In the space of time tunnel shown in FIG. 9, the movies were mapped in such a manner that the production years of movies are placed axially and the genre thereof is allocated circumferentially with different angles. In the storage space shown in FIG. 10, the information elements are arranged in a hierarchically classifying manner according to the category of movie, so as to have "action movies→hard-boiled movies", for example. In the space based on the semantic contents of texts, each movie is mapped based on opinion or evaluation of each movie obtained from movie sites, for example.

In the present embodiments, the motion of an information element at the time of morphing is enabled by interpolation, and the information on the motion path enabled by the interpolation is stored in the element motion path storage 44. In order to achieve the effect in which the information elements are further dramatically moved by morphing and to express special effects, the following characteristics may be given to the motion path which will be described and stored in the element motion path storage 44.

1) An "intermediate assembly position" is so described that the information elements gather once at a predetermined point in the middle of motion, and each information element is caused to move to each final position via the intermediate assembly point.

2) Said intermediate point is provided externally to a screen or an edge of the screen, and expressed is a state in which the information elements are temporarily "exploded and scattered" at the time of morphing.

3) The motion path is set in a manner such that the information elements moves in complex ways and special patterns are generated among them regardless of the presence or absence of the intermediate assembly point.

It is to be noted here that the special effects such as "explosion" may go into effect when the user intentionally moves the space to a next information space, or the special effects may not be executed at all when the space is to be moved due to the fact that there is no input from the user for a certain period of time, or any other various combination may be possible.

The special effect such as "explosion" may be executed even when part of information space is cut out, by a marked-out space which has been set, as a volume. For example, when the cut-out volume is to be displayed, the information elements to be contained therein are first displayed in a manner such that they are once scattered around and are thereafter gathered again at another place. Thus, it is preferable, for example, that when a special effect processing unit (not shown) is provided in the graphic controller 150 of the drawing unit 20 and the marked-out space and information elements to be contained therein are subject to a field-of-view translation, the coordinates are computed so that the information elements are scattered around. In this structure, when data specifying the marked-out space are arrived from the marked-out space acquiring unit 124, the special effect processing unit operates to display a desired special effect with animation. This animation of course may be changed as the case may be, and in such a case the user can grasp the situation by the animation. It is to be noted here that the special effect by the special effect processing unit may be executed in place of or in addition to the above-described method not only at the time of cutting out the marked-out space but also at the time of usual morphing.

In the present embodiments, the file belonging to the genre selected by the file selector 100 is mapped to the information space. In addition thereto, "inputting by users the information elements to the information space" may be granted. Thereby, a function in which a single file specified by the user is selected from the element storage 34 is implemented in the file selector 100, for instance.

For example, even in the emotion space shown in FIG. 14 where the clustering has been done, there are cases where it is not so clear to the users how the space is defined using what indexes and which information elements are contained in the space. The subjective attributes such as emotion or purposes are heavily dependent on each individual. Thus, if the user can explicitly input information elements, contents of which he/she knows very well, into an information space, the space information and the overview of the information elements arranged therein would be easily grasped from the mapping position of the information elements. The thus inputted information elements are explicitly mapped within the information space according to the attributes thereof.

Prior to inputting the information elements, the information elements to be inputted may be assigned, by user through the above-mentioned element attribute assigning unit (not shown) with attributes based on user's own taste, sensibility or evaluation. In such a case, the information space based on a predefined index is compared with a user's personal index, so that the contents of other information elements mapped can be grasped in further detail. In the case of the emotion space, a difference between the user's emotion and the emotion in the predefined information space can be recognized as a spatial difference. For example, consider a case where a file to which an attribute is given beforehand as an evaluation done by a movie critic is mapped to the emotion space. Then, if the user's own evaluation is inputted to a file for movies that the user has already seen, the correlation between the critic's evaluation and user's own evaluation can be found, so that the mapping position of a desired movie can be further accurately estimated.

Hereinafter, the advantageous effects achieved by the present embodiments will be summarized.

Even the users who do not have special skill in information search can intuitively search for desired information elements from among a mass of candidates. The screen displayed in the course of the search provides aesthetic and visual effects.

A mass of information elements can be viewed loosely, so that an overall trend in the information elements is easily grasped. The information is displayed vaguely, so that little difference is caused in the appearance thereof even when the display devices have different resolutions.

If a large-size display device is used in a living room, a distance tends to be larger between the screen and the user. However, since the loose way of display is implemented according to the present embodiments, there is a high tolerance for the distance between the screen and the user. Moreover, the "loose search" may be done at the screen distant from the user whereas the "accurate selection" may be carried out by a relatively small display apparatus in the user's hand.

The cruising or morphing is automatically started, thus providing aesthetically interesting effects and serving to function also as a screen saver. Moreover, the information elements can be viewed in various information spaces and from various viewpoints, so that method and apparatus according to the present embodiments can support the user in grasping the positions of desired information elements.

If the information elements handled in the present embodiments are collected from the Internet or other sites on the network, the similarity among the sites can be determined and the analysis can be performed to find out about which kinds of site have been mostly hit relative to a particular search and so forth.

Though the information elements are represented by the luminous bodies according to the present embodiments, the representation is not limited thereto and the other may be used. The attributes may be represented in color or shape of a symbol. For example, files having the attribute "hilarious" may be represented in bright color, so that further intuitive search of information can be realized.

Various modes of the invention deriving and apprehended from the above present embodiments and modified examples are hereinbelow exemplified in such a form that also includes the description in the appended claims.

First, the following group A is recognized as a group involving a space representation and an overall flow of information search. Each item in the group A may be arbitrarily combined with another item or other items, and the same is applied to group B. Even among different groups, items that are possibly combined therebetween may be combined of course and the modification arising from such combination will be effective as and encompassed by the present embodiments.

A1. A method for presenting information, including: representing a plurality of information elements in symbols and mapping the information elements represented in symbols to an information space; and limiting the information elements using a marked-out space set in the information space. The limiting the information elements includes executing narrowing-down of the information elements.

A2. The limiting the information elements includes: receiving specification of the marked-out space in the information space; and specifying information elements that belong to the marked-out space in such a manner as to be distinguishable from information element that do not belong to the marked-out space.

A3. The information elements are mapped to the information space where attributes of the information elements serve as a space axis.

A4. The attributes include a subjective element which is not primarily possessed by a file and is not quantified. Examples for the attribute of the subjective element include emotions, meanings, tendency of wording used and so forth.

A5. A space which includes an information element specified as that belonging to the marked-out space is created as a new marked-out space, and the method further includes: receiving specification to further limit the information elements in the new marked-out space.

A6. The method further includes: developing the information elements in a state represented by the symbols into a form that concretely represents information contents thereof when the number of information elements belonging to the marked-out space becomes small. An example for this would be a linear development described in the above embodiments.

A7. The information element is represented as a semitransparent object, and an overlap of information elements is represented by alpha blending. A meta-ball or a form-primitive may be utilized as the above semitransparent object.

A8. The information element is represented by a form symbol which is not dependent on the orientation. The computation amount will be reduced if used are shape symbols, such as metaball and ball, which are not dependent on the orientation.

A9. The information element is represented in symbols that correspond to the mode of an attribute of the information element. For example, a new piece of information is made to rotate and thus displayed. And if the size of a file is large, it is represented by a large ball. Thereby, the contents of the information element is suitably implied and emphasized.

Next, the present invention relating to the change of space display is recognized as the group B as follows.

B1. A method for presenting information, including: representing in symbols a plurality of information elements and mapping the information elements represented in symbols to a first information space; and initiating the transition from the first information space to a second information space. The "second information space" includes the cases of auto cruise and morphing mentioned in the present embodiments. The "changing the space" includes both the case of auto cruise and the case of morphing in this patent specification.

B2. The first information space is a three-dimensional space, and the transition is made to the second information space by causing to move a viewpoint from which the three-dimensional space is viewed. This corresponds to the auto cruise mentioned in the present embodiments. The "viewpoint" is typical of a camera parameter.

B3. The first information space is determined in a manner such that an attribute of the information element serves as a space axis, and the transition to the second information space is carried out by switching the attribute. Thereby, the switching of spaces is realized.

B4. The first information space and the second information space are switched therebetween by morphing.

B5. The morphing is realized in such a manner that each information element is moved, along a predetermined path, from a position of the information element occupied in the first information space to a position of the information element occupied in the second information space. If this path is taken to be various kinds of curves or if all of the information elements are once gathered in a predetermined spot and scattered thereafter and so forth, then the motion of information elements will be amusing and so forth.

B6. At least one of the first information space and the second information space is constructed on a two- or three-dimensional map.

B7. At least one of the first information space and the second information space is a space that symbolizes emotion.

B8. At least one of the first information space and the second information space is a hierarchized space having each category of information as a unit region.

B9. At least one of the first information space and the second information space is a space, having a predetermined shape, which is obtained by normalizing the mapping position of the information element.

B10. The method further includes: displaying, for each cluster of information elements localized in a space, a marker indicative of a characteristic thereof when the information element is allocated in at least one of the first information space and the second information space.

B11. The method further includes: specifying a content of information element that exists in an area, pointed by a pointing means in a screen for selecting information elements, or in the vicinity of the area when at least one of the first information space and the second information space is displayed. In the present embodiments, this corresponds to displaying the information on a cursor position in the lower left of a screen.

B12. The method further includes: causing to reverse-reproduce the morphing from the second information space to the first information space after the first information space is switched to the second information space by morphing.

Next, the following invention is recognized as group C relating to the space display and the overall information search.

C1. An information presenting apparatus, including: a space controller which represents a plurality of information elements in symbols and maps the information elements represented in symbols to an information space; and an information selector which limits the information elements using a marked-out space set in the information space.

C2. The information selector includes: a marked-out space setting unit which receives specification of a marked-out space in the information space; and a marked-out space acquiring unit which specifies the marked-out space determined by the specification of a marked-out space and information elements that belong to the determined marked-out space.

C3. The marked-out space setting unit receives specification of position and range of the marked-out space.

C4. The information presenting apparatus further includes: an information development unit which develops the information elements in a state represented by the symbols into a form that concretely represents information contents thereof when the number of information elements belonging to the marked-out space becomes small.

C5. The information presenting apparatus further includes: a symbol selector which selects symbols to be suitably adapted for the information elements. A star-like mark, a metaball or the like is used as the symbol.

C6. The information presenting apparatus further includes: a symbol attribute specifying unit which represents the information element in symbol using a form suited to the information element.

Next, apparatus relating to the change of space display is recognized as group D as follows.

D1. An information presenting apparatus, including: an element mapping unit which represents a plurality of information elements in symbols and maps the information elements represented in symbols to a first information space; and a space motion instructing unit which initiates a transition from the first information space to a second information space.

D2. The space motion instructing unit instructs a motion of a viewpoint from which the first space is viewed.

D3. The first information space is determined in a manner such that an attribute of the information element serves as a space axis, and the space motion instructing unit instructs switching the attribute of the information element utilized as the space axis at the time of determining the first information space.

D4. The space motion instructing unit instructs the transition from the first information space to the second information space when there is no user action for a predetermined period of time.

D5. The information presenting apparatus further includes: a drawing unit which switches between the first information space and the second information space by morphing.

D6. The drawing unit causes each information element to move, along a predetermined path, from a position of the information element occupied in the first information space to a position of the information element occupied in the second information space.

D7. The information presenting apparatus further includes: a space selector which acquires at least one of the first information space and the second information space as a space represented by a two- or three-dimensional map.

D8. The information presenting apparatus further includes: a space selector which acquires at least one of the first information space and the second information space as a space that symbolizes emotion.

D9. The information presenting apparatus further includes: a space selector which acquires at least one of the first information space and the second information space as a hierarchized space having each category of information as a unit region.

D10. The information presenting apparatus further includes: a space selector which acquires at least one of the first information space and the second information space as a space, having a predetermined shape, which is obtained by normalizing the mapping position of the information element.

D11. The information presenting apparatus further includes: an auxiliary information acquiring unit which acquires a content of an information element that exists in an area, pointed by a pointing means in a screen for selecting information elements, or in the vicinity of the area when at least one of the first information space and the second information space is displayed.

Next, the present invention viewed from different points of view from the aforementioned is recognized as group E as follows.

E1. An information presenting apparatus, including: a space controller which maps, as symbols, a plurality of information elements each being separately executable by a computer to an information space; and a drawing unit which draws a plurality of symbols mapped, in an inseparable manner, when the symbols are displayed at an overlapped position. The area where the information gathers is drawn vaguely or in a blurry manner, so that the overwhelmingly excessive amount of information can be avoided.

E2. The drawing unit draws the symbols in a manner such that a plurality of symbols mapped are represented in an inseparable manner by drawing each symbol as an object whose boundary is loosely defined.

E3. An information presenting apparatus, including: a space controller which maps, as symbols, a plurality of information elements to an information space; and an information selector which executes a search on the symbols in a manner such that part of the information space is cut out as a lump of volume which is assumed to include a symbol of interest.

E4. An information presenting apparatus, including: a space controller which maps, as symbols, a plurality of information elements to an information space; and an information selector which cuts out, as a lump of volume, a space containing the information elements instead of directly specifying the information elements, in the event of selecting the information elements.

E5. An information presenting apparatus, including: a space controller which maps, as symbols, a plurality of information elements to an information space; and a drawing unit which draws a plurality of symbols mapped, wherein as a result of combined use of the space controller and the drawing unit, the information space is represented as a vast space, for example, as a vast dark space of a global or universal scale, and the symbols are represented as luminous bodies scattered in the vast space.

E6. An information presenting apparatus, including: a space controller which maps, as symbols, a plurality of information elements to an information space; and a drawing unit which draws a plurality of symbols mapped, wherein the drawing unit varies, as appropriate, a camera parameter so as to redraw the symbols. An example for this apparatus would be apparatus that includes the morphing and auto cruise described in the present embodiments.

E7. The drawing unit redraws the symbols so as to express a state in which a user cruises continuously within the information space.

E8. The space controller represents the space as a vast space and represents the symbol as a huge object. The drawing unit expresses a state where the user makes his/her way through between those symbols by cruising therethrough in a virtual manner.

E9. A method for presenting information, including: mapping, as symbols, information elements to an information space; receiving, from a user, specification of an information element which is different from the information elements already mapped; and mapping the specified information element to the information space in an explicitly presenting manner.

Although the present invention has been described by way of exemplary embodiments, it should be understood that many changes and substitutions may further be made by those skilled in the art without departing from the scope of the present invention which is defined by the appended claims.

What is claimed is:

1. A method for presenting information, the method including:
representing a plurality of information elements using symbols, wherein each information element is separately executable via a computer by a user action on a corresponding symbol;
mapping the information elements to corresponding symbols on a first information space and a second information space;
displaying the first information space on a computer; and initiating a morphing from the first information space to the second information space, wherein the first information space is different from the second information space and each symbol on the first information space maps to a respective symbol on the second information space and a cluster of symbols on the first information space is different from a cluster of symbols on the second information space, and wherein the morphing is instructed by a space motion instructing unit, wherein the space motion instructing unit instructs the morphing when there is no user action for a predetermined period of time, and wherein, when a user action interrupts the morphing process, the currently displayed morphed information space and the respective symbols are presented to the user for interaction.

2. A method according to claim 1, wherein the first information space is a three-dimensional space and the morphing is made to the second information space by moving a viewpoint from which the three-dimensional space is viewed.

3. A method according to claim 1, wherein the first information space is determined in a manner such that an attribute of one of the information elements serves as a space axis, and wherein the morphing to the second information space is carried out by switching the attribute.

4. A method according to claim 1, further including assigning to each of the clusters of information elements a marker indicative of a characteristic when the associated cluster is allocated in at least one of the first information space and the second information space.

* * * * *